United States Patent
Asai

(10) Patent No.: US 12,230,770 B2
(45) Date of Patent: **\*Feb. 18, 2025**

(54) SLURRY COMPOSITION FOR NON-AQUEOUS SECONDARY BATTERY HEAT-RESISTANT LAYER, HEAT-RESISTANT LAYER FOR NON-AQUEOUS SECONDARY BATTERY, AND NON-AQUEOUS SECONDARY BATTERY

(71) Applicant: ZEON CORPORATION, Tokyo (JP)

(72) Inventor: Kazuki Asai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 477 days.

This patent is subject to a terminal disclaimer.

(21) Appl. No.: 17/753,559

(22) PCT Filed: Aug. 31, 2020

(86) PCT No.: PCT/JP2020/032950
§ 371 (c)(1),
(2) Date: Mar. 8, 2022

(87) PCT Pub. No.: WO2021/059880
PCT Pub. Date: Apr. 1, 2021

(65) Prior Publication Data
US 2022/0336868 A1 Oct. 20, 2022

(30) Foreign Application Priority Data
Sep. 27, 2019 (JP) ................ 2019-177716

(51) Int. Cl.
| | |
|---|---|
| *H01M 10/42* | (2006.01) |
| *C08F 220/56* | (2006.01) |
| *C08F 265/06* | (2006.01) |
| *C08L 33/26* | (2006.01) |
| *C08L 51/00* | (2006.01) |
| *H01M 10/0525* | (2010.01) |
| *H01M 50/449* | (2021.01) |
| *H01M 50/489* | (2021.01) |

(52) U.S. Cl.
CPC ....... *H01M 10/4235* (2013.01); *C08F 220/56* (2013.01); *C08F 265/06* (2013.01); *C08L 33/26* (2013.01); *C08L 51/003* (2013.01); *H01M 10/0525* (2013.01); *H01M 50/449* (2021.01); *H01M 50/489* (2021.01); *C08L 2201/08* (2013.01); *C08L 2201/54* (2013.01)

(58) Field of Classification Search
CPC ........ H01M 10/4235; H01M 10/0525; H01M 50/449; H01M 50/489; H01M 4/62; H01M 50/434; H01M 50/44; H01M 50/446; H01M 50/451; H01M 50/454; H01M 50/417; H01M 4/13; H01M 4/622; H01M 50/423; H01M 50/443; H01M 50/409; H01M 50/411; C08F 220/56; C08F 265/06; C08F 220/58; C08L 33/26; C08L 51/003; C08L 2201/08; C08L 2201/54; C08L 33/08; C09J 133/08
See application file for complete search history.

(56) References Cited

U.S. PATENT DOCUMENTS

| | | | |
|---|---|---|---|
| 2013/0330622 A1 | 12/2013 | Sasaki | |
| 2014/0141314 A1* | 5/2014 | Kaneda | H01M 50/42 429/211 |
| 2016/0359156 A1 | 12/2016 | Ohkubo | |
| 2018/0258202 A1* | 9/2018 | Sonobe | H01M 4/139 |

FOREIGN PATENT DOCUMENTS

| | | |
|---|---|---|
| JP | 2013145763 A | 7/2013 |
| JP | 2019057488 A | 4/2019 |
| WO | 2012115096 A1 | 8/2012 |
| WO | 2014103791 A1 | 7/2014 |
| WO | 2015129408 A1 | 9/2015 |
| WO | 2019013102 A1 | 1/2019 |

OTHER PUBLICATIONS

Mar. 15, 2022, International Preliminary Report on Patentability issued in the International Patent Application No. PCT/JP2020/032950.
Nov. 17, 2020, International Search Report issued in the International Patent Application No. PCT/JP2020/032950.
Aug. 7, 2024, the Extended European Search Report issued by the European Patent Office in the corresponding European Patent Application No. 20869783.9.

* cited by examiner

Primary Examiner — Muhammad S Siddiquee
(74) Attorney, Agent, or Firm — KENJA IP LAW PC

(57) ABSTRACT

Provided is a slurry composition for a non-aqueous secondary battery heat-resistant layer that has excellent dispersion stability and coatability and can form a heat-resistant layer for a non-aqueous secondary battery having both excellent heat shrinkage resistance and reduced residual water content. The slurry composition contains a water-soluble polymer, non-conductive organic particles, and water. The water-soluble polymer includes an amide group-containing monomer unit, an acid group-containing monomer unit, and a hydroxyl group-containing monomer unit. The proportional content of the amide group-containing monomer unit in the water-soluble polymer is not less than 63 mass % and not more than 98 mass %, and the proportional content of the acid group-containing monomer unit in the water-soluble polymer is not less than 1 mass % and not more than 20 mass %. The non-conductive organic particles include a crosslinkable monomer unit with a proportional content of not less than 20 mass % and not more than 95 mass %.

6 Claims, No Drawings

SLURRY COMPOSITION FOR NON-AQUEOUS SECONDARY BATTERY HEAT-RESISTANT LAYER, HEAT-RESISTANT LAYER FOR NON-AQUEOUS SECONDARY BATTERY, AND NON-AQUEOUS SECONDARY BATTERY

TECHNICAL FIELD

The present disclosure relates to a slurry composition for a non-aqueous secondary battery heat-resistant layer, a heat-resistant layer for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A secondary battery typically includes battery members such as electrodes (positive electrode and negative electrode) and a separator that isolates the positive electrode and the negative electrode from each other. Battery members that include a protective layer for improving heat resistance (i.e., a heat-resistant layer) are conventionally used as such battery members.

A heat-resistant layer of a secondary battery may be a layer that is formed by binding non-conductive particles through a binder. Such a heat-resistant layer is normally formed by preparing a slurry composition (hereinafter, also referred to as a "slurry composition for a non-aqueous secondary battery heat-resistant layer" or simply as a "slurry composition for a heat-resistant layer") having non-conductive particles and a binder dissolved or dispersed in a dispersion medium such as water, and then applying the slurry composition for a heat-resistant layer onto a substrate such as a separator substrate or electrode substrate and drying the slurry composition for a heat-resistant layer.

In recent years, attempts have been made to improve binder compositions and slurry compositions for heat-resistant layers used in heat-resistant layer formation in order to achieve further improvement of secondary battery performance (for example, refer to Patent Literature (PTL) 1).

As one specific example, PTL 1 discloses a binder composition for a secondary battery porous membrane that contains a polycarboxylic acid having specific properties and water, and reports that this binder composition for a secondary battery porous membrane has high preservation stability and that a porous membrane for a secondary battery produced using the binder composition is easy to coat and enables production of a secondary battery having improved performance in terms of high-temperature cycle characteristics and the like.

CITATION LIST

Patent Literature

PTL 1: WO2015/129408A1

SUMMARY

Technical Problem

However, there has been demand for further improvement of secondary battery performance in recent years, and the conventional binder composition described above leaves room for improvement in terms of improving dispersion stability of a slurry composition for a heat-resistant layer produced using the binder composition while also further increasing coatability of the slurry composition for a heat-resistant layer. Moreover, it would be desirable to further improve the heat shrinkage resistance of a heat-resistant layer obtained using the conventional binder composition and slurry composition for a heat-resistant layer described above while also reducing the amount of water that is imported into a secondary battery by the heat-resistant layer (i.e., reduce residual water content in the heat-resistant layer).

Accordingly, one object of the present disclosure is to provide a slurry composition for a non-aqueous secondary battery heat-resistant layer that has excellent dispersion stability and coatability and that can form a heat-resistant layer for a non-aqueous secondary battery having both excellent heat shrinkage resistance and reduced residual water content.

Another object of the present disclosure is to provide a heat-resistant layer for a non-aqueous secondary battery that has both excellent heat shrinkage resistance and reduced residual water content and a non-aqueous secondary battery that includes this heat-resistant layer.

Solution to Problem

The inventor conducted diligent investigation with the aim of solving the problems set forth above. The inventor first conceived an idea that a slurry composition for a heat-resistant layer containing non-conductive particles, water, and a water-soluble polymer that includes an amide group-containing monomer unit, an acid group-containing monomer unit, and a hydroxyl group-containing monomer unit and in which the proportional contents of the amide group-containing monomer unit and the acid group-containing monomer unit are within specific ranges will have excellent dispersion stability and coatability and that a heat-resistant layer having excellent heat shrinkage resistance can be formed using this slurry composition for a heat-resistant layer.

In addition, the inventor discovered through further extensive investigation that by using non-conductive organic particles in which the proportional content of a cross-linkable monomer unit is within a specific range as non-conductive particles in production of the aforementioned slurry composition for a heat-resistant layer, it is also possible to reduce residual water content in a heat-resistant layer. In this manner, the inventor completed the present disclosure.

Specifically, the present disclosure aims to advantageously solve the problem set forth above, and a presently disclosed slurry composition for a non-aqueous secondary battery heat-resistant layer comprises a water-soluble polymer, non-conductive organic particles, and water, wherein the water-soluble polymer includes an amide group-containing monomer unit, an acid group-containing monomer unit, and a hydroxyl group-containing monomer unit, proportional content of the amide group-containing monomer unit in the water-soluble polymer is not less than 63 mass % and not more than 98 mass % and proportional content of the acid group-containing monomer unit in the water-soluble polymer is not less than 1 mass % and not more than 20 mass %, the non-conductive organic particles include a cross-linkable monomer unit, and proportional content of the cross-linkable monomer unit in the non-conductive organic particles is not less than 20 mass % and not more than 95 mass %. A slurry composition for a heat-resistant layer that contains water and a water-soluble polymer and non-conductive organic particles having specific chemical compositions in this manner has excellent dispersion stability and coatability. Moreover, this slurry composition for a heat-resistant layer enables good formation of a heat-resistant layer having both excellent heat shrinkage resistance and reduced residual water content.

The phrase "includes a monomer unit" as used in relation to a polymer in the present disclosure means that "a polymer obtained with the monomer includes a repeating unit derived from the monomer".

Moreover, the "proportional content (mass %)" of each monomer unit (each repeating unit) included in a polymer that is referred to in the present disclosure can be measured using a nuclear magnetic resonance (NMR) method such as $^1$H-NMR or $^{13}$C-NMR.

In the presently disclosed slurry composition for a non-aqueous secondary battery heat-resistant layer, proportional content of the hydroxyl group-containing monomer unit in the water-soluble polymer is preferably not less than 1 mass % and not more than 25 mass %. When the proportional content of the hydroxyl group-containing monomer unit in the water-soluble polymer is within the range set forth above, dispersion stability and coatability of the slurry composition for a heat-resistant layer can be further improved, and heat shrinkage resistance of a heat-resistant layer can be even further increased.

In the presently disclosed slurry composition for a non-aqueous secondary battery heat-resistant layer, the hydroxyl group-containing monomer unit is preferably a hydroxyl group-containing (meth)acrylamide monomer unit. When the hydroxyl group-containing monomer unit included in the water-soluble polymer of the slurry composition for a heat-resistant layer is a hydroxyl group-containing (meth)acrylamide monomer unit, residual water content in a heat-resistant layer can be further reduced while also even further increasing heat shrinkage resistance of the heat-resistant layer. In addition, cycle characteristics of a secondary battery can be improved.

Note that in the present disclosure, "(meth)acryl" is used to indicate "acryl" and/or "methacryl".

In the presently disclosed slurry composition for a non-aqueous secondary battery heat-resistant layer, a molar ratio of proportional content of the hydroxyl group-containing monomer unit relative to proportional content of the acid group-containing monomer unit in the water-soluble polymer is preferably 0.70 or more. When the molar ratio of the proportional content of the hydroxyl group-containing monomer unit relative to the proportional content of the acid group-containing monomer unit in the water-soluble polymer (hereinafter, also referred to simply as the "hydroxyl group/acid group molar ratio") is not less than the lower limit set forth above, dispersion stability and coatability of the slurry composition for a heat-resistant layer can be further improved.

Note that the "hydroxyl group/acid group molar ratio" referred to in the present disclosure can be calculated from measurement values that are obtained through measurement of the proportional content (mol %) of the acid group-containing monomer unit and the proportional content (mol %) of the hydroxyl group-containing monomer unit by a nuclear magnetic resonance (NMR) method such as $^1$H-NMR or $^{13}$C-NMR.

It is preferable that the presently disclosed slurry composition for a non-aqueous secondary battery heat-resistant layer further comprises a particulate polymer, wherein the non-conductive organic particles have a glass-transition temperature of 110° C. or higher, and the particulate polymer has a glass-transition temperature of lower than 20° C. By using a slurry composition for a heat-resistant layer that further contains a particulate polymer having a glass-transition temperature of lower than 20° C., good close adherence of a heat-resistant layer and a substrate can be achieved. In addition, a secondary battery can be provided with excellent cycle characteristics. Moreover, when the glass-transition temperature of the non-conductive organic particles is not lower than the lower limit set forth above, heat shrinkage resistance of a heat-resistant layer can be further improved.

Note that the "glass-transition temperature" of non-conductive organic particles or a particulate polymer referred to in the present disclosure can be measured using a method described in the EXAMPLES section of the present specification.

Moreover, the present disclosure aims to advantageously solve the problems set forth above, and a presently disclosed heat-resistant layer for a non-aqueous secondary battery is formed using any one of the slurry compositions for a non-aqueous secondary battery heat-resistant layer set forth above. A heat-resistant layer that is formed from any one of the slurry compositions for a heat-resistant layer set forth above in this manner has excellent heat shrinkage resistance and reduced residual water content.

Furthermore, the present disclosure aims to advantageously solve the problems set forth above, and a presently disclosed non-aqueous secondary battery comprises the heat-resistant layer for a non-aqueous secondary battery set forth above. A secondary battery that includes a battery member including the heat-resistant layer set forth above in this manner has sufficiently ensured safety and excellent cycle characteristics.

Advantageous Effect

According to the present disclosure, it is possible to provide a slurry composition for a non-aqueous secondary battery heat-resistant layer that has excellent dispersion stability and coatability and that can form a heat-resistant layer for a non-aqueous secondary battery having both excellent heat shrinkage resistance and reduced residual water content.

Moreover, according to the present disclosure, it is possible to provide a heat-resistant layer for a non-aqueous secondary battery that has both excellent heat shrinkage resistance and reduced residual water content and a non-aqueous secondary battery that includes this heat-resistant layer.

DETAILED DESCRIPTION

The following provides a detailed description of embodiments of the present disclosure.

The presently disclosed slurry composition for a non-aqueous secondary battery heat-resistant layer can be used in formation of a heat-resistant layer of a non-aqueous secondary battery such as a lithium ion secondary battery. Moreover, a feature of the presently disclosed heat-resistant layer for a non-aqueous secondary battery is that it is formed from the presently disclosed slurry composition for a non-aqueous secondary battery heat-resistant layer. Furthermore, a feature of the presently disclosed non-aqueous secondary battery is that it includes a heat-resistant layer for a non-aqueous secondary battery that has been produced using the presently disclosed slurry composition for a non-aqueous secondary battery heat-resistant layer.

(Slurry Composition for Non-Aqueous Secondary Battery Heat-Resistant Layer)

The presently disclosed slurry composition for a heat-resistant layer contains a water-soluble polymer, non-conductive organic particles, and water serving as a dispersion medium, and optionally further contains a particulate polymer and other components.

One feature of the presently disclosed slurry composition for a heat-resistant layer is that the aforementioned water-soluble polymer includes an amide group-containing monomer unit, an acid group-containing monomer unit, and a hydroxyl group-containing monomer unit, that the proportional content of the amide group-containing monomer unit is not less than 63 mass % and not more than 98 mass %, and that the proportional content of the acid group-containing monomer unit is not less than 1 mass % and not more than 20 mass %. Another feature of the presently disclosed slurry composition for a heat-resistant layer is that the aforementioned non-conductive organic particles include a cross-linkable monomer unit and that the proportional content of the cross-linkable monomer unit is not less than 20 mass % and not more than 95 mass %.

As a result of the presently disclosed slurry composition for a heat-resistant layer containing, in water, a water-soluble polymer that includes an amide group-containing monomer unit, an acid group-containing monomer unit, and a hydroxyl group-containing monomer unit and in which the proportional contents of the amide group-containing monomer unit and the acid group-containing monomer unit are within the ranges set forth above and non-conductive organic particles in which the proportional content of a cross-linkable monomer unit is within the range set forth above, the slurry composition for a heat-resistant layer has excellent dispersion stability and coatability and can be used to form a heat-resistant layer having both excellent heat shrinkage resistance and reduced residual water content. Although it is not clear why the effects described above are obtained by using a slurry composition for a heat-resistant layer that has the above-described water-soluble polymer and non-conductive organic particles dissolved or dispersed in water, the reason for this is presumed to be as follows.

Firstly, the amide group-containing monomer unit included in the water-soluble polymer of the slurry composition for a heat-resistant layer is thought to function as a main framework for imparting high rigidity to the water-soluble polymer and thereby improving heat shrinkage resistance of an obtained heat-resistant layer.

Moreover, the acid group-containing monomer unit included in the water-soluble polymer of the slurry composition for a heat-resistant layer interacts with the non-conductive organic particles through electrostatic interactions in the slurry and thereby functions as a site of adsorption to the non-conductive organic particles. However, excessively strong interaction of an acid group-containing monomer unit with non-conductive organic particles may cause aggregation of the non-conductive organic particles through pseudo cross-linking and reduce dispersion stability of the non-conductive organic particles in a slurry. Adsorption through such excessive interaction of an acid group-containing monomer unit with non-conductive organic particles can be inhibited herein through a hydration effect of a hydroxyl group because the water-soluble polymer further includes a hydroxyl group-containing monomer unit. It is thought that for this reason, the dispersion stability of the non-conductive organic particles in the slurry can be improved.

Moreover, a slurry composition having excellent dispersion stability as described above is thought to have excellent coatability because the slurry composition can be uniformly applied onto a substrate without variation of coating weight and without the formation of defects (streaks, uneven coating, cissing, etc.) in the resultant heat-resistant layer.

Furthermore, as a result of the non-conductive organic particles contained in the slurry composition for a heat-resistant layer including, in a specific proportion, a cross-linkable monomer unit that contributes to raising the hardness and glass-transition temperature of the non-conductive organic particles, the non-conductive organic particles can function well as non-conductive particles that impart heat resistance and strength to a heat-resistant layer. In addition, moisture attached to the surfaces of the non-conductive organic particles contained in the slurry composition for a heat-resistant layer can easily be removed by heating or the like as compared to non-conductive inorganic particles such as alumina.

Consequently, the presently disclosed slurry composition for a heat-resistant layer has excellent dispersion stability and coatability. Moreover, the presently disclosed slurry composition for a heat-resistant layer can be used to obtain a heat-resistant layer having both excellent heat shrinkage resistance and reduced residual water content.

<Water-Soluble Polymer>

The water-soluble polymer contained in the slurry composition for a non-aqueous secondary battery heat-resistant layer is a component that can contribute to improving dispersion stability and coatability of the slurry composition for a heat-resistant layer. Moreover, the water-soluble polymer is a component that can function as a binder in a heat-resistant layer formed using the slurry composition for a heat-resistant layer, and can impart adhesiveness to a heat-resistant layer formed using the slurry composition for a heat-resistant layer while also holding non-conductive organic particles contained in the heat-resistant layer so that the non-conductive organic particles do not detach from the heat-resistant layer.

Note that when a polymer is referred to as "water-soluble" in the present disclosure, this means that when 0.5 g of the polymer is dissolved in 100 g of water at a temperature of 25° C., insoluble content is less than 1.0 mass %.

The water-soluble polymer includes an amide group-containing monomer unit and an acid group-containing monomer unit in proportions that are within specific ranges and also includes a hydroxyl group-containing monomer unit. Note that the water-soluble polymer may include repeating units other than the amide group-containing monomer unit, the acid group-containing monomer unit, and the hydroxyl group-containing monomer unit (hereinafter, referred to as "other repeating units").

<<Amide Group-Containing Monomer Unit>>

Examples of amide group-containing monomers that can form the amide group-containing monomer unit include N-vinylacetamide, (meth)acrylamide, dimethyl(meth)acrylamide, diethyl(meth)acrylamide, N-methoxymethyl(meth)acrylamide, and dimethylaminopropyl(meth)acrylamide. Of these amide group-containing monomers, acrylamide and methacrylamide are preferable from a viewpoint of even further increasing heat shrinkage resistance of a heat-resistant layer, and acrylamide is more preferable. One amide group-containing monomer may be used individually, or two or more amide group-containing monomers may be used in combination.

Note that a monomer unit including both an amide group and a hydroxyl group is considered to be included among the "hydroxyl group-containing monomer unit" and not be included among the "amide group-containing monomer unit" in the present disclosure. Moreover, a monomer unit including both an amide group and an acid group (carboxy group, sulfo group, phosphate group, etc.) is considered to be included among the "acid group-containing monomer unit" and not be included among the "amide group-containing monomer unit" in the present disclosure.

When the amount of all repeating units (all monomer units) in the water-soluble polymer used herein is taken to be 100 mass %, the proportional content of the amide group-containing monomer unit in the water-soluble polymer is required to be not less than 63 mass % and not more than 98 mass %. Moreover, the proportional content of the amide group-containing monomer unit in the water-soluble polymer is preferably 65 mass % or more, more preferably 67 mass % or more, and even more preferably 71 mass % or more, and is preferably 95 mass % or less, and more preferably 90 mass % or less. When the proportional content of the amide group-containing monomer unit in the water-soluble polymer is less than 63 mass %, heat shrinkage resistance of a heat-resistant layer cannot be sufficiently ensured because rigidity of the water-soluble polymer decreases. On the other hand, when the proportional content of the amide group-containing monomer unit in the water-soluble polymer is more than 98 mass %, dispersion stability of the slurry composition for a heat-resistant layer decreases.

<<Acid Group-Containing Monomer Unit>>

Examples of acid group-containing monomers that can form the acid group-containing monomer unit include carboxy group-containing monomers, sulfo group-containing monomers, and phosphate group-containing monomers. Note that an acid group of the acid group-containing monomer unit may form a salt with an alkali metal, ammonia, or the like.

Examples of carboxy group-containing monomers that can form a carboxy group-containing monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

An acid anhydride that produces a carboxy group through hydrolysis can also be used as a carboxy group-containing monomer.

Examples of sulfo group-containing monomers that can form a sulfo group-containing monomer unit include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers that can form a phosphate group-containing monomer unit include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One of the acid group-containing monomers described above may be used individually, or two or more of the acid group-containing monomers described above may be used in combination. From a viewpoint of improving close adherence of a heat-resistant layer and a substrate and also even further improving coatability of the slurry composition for a heat-resistant layer, carboxy group-containing monomers are preferable, monocarboxylic acids are more preferable, and acrylic acid is even more preferable as an acid group-containing monomer that can form the acid group-containing monomer unit.

When the amount of all repeating units (all monomer units) in the water-soluble polymer used herein is taken to be 100 mass %, the proportional content of the acid group-containing monomer unit in the water-soluble polymer is required to be not less than 1 mass % and not more than 20 mass %, is preferably 2 mass % or more, more preferably 3 mass % or more, even more preferably 5 mass % or more, and particularly preferably 7 mass % or more, and is preferably 16 mass % or less, and more preferably 12 mass % or less. When the proportional content of the acid group-containing monomer unit in the water-soluble polymer is less than 1 mass %, coatability of the slurry composition for a heat-resistant layer decreases. Moreover, close adherence of a heat-resistant layer and a substrate cannot be sufficiently ensured because adsorption strength of the water-soluble polymer to the non-conductive organic particles decreases. On the other hand, when the proportional content of the acid group-containing monomer unit in the water-soluble polymer is more than 20 mass %, dispersion stability of the slurry composition for a heat-resistant layer decreases.

<<Hydroxyl Group-Containing Monomer Unit>>

Examples of hydroxyl group-containing monomers that can form the hydroxyl group-containing monomer unit include hydroxyl group-containing (meth)acrylamide monomers such as N-hydroxymethylacrylamide, N-hydroxyethylacrylamide, N-hydroxypropylacrylamide, N-hydroxymethylmethacrylamide, N-hydroxyethylmethacrylamide, and N-hydroxypropylmethacrylamide; and hydroxyl group-containing (meth)acrylate monomers such as 2-hydroxymethyl acrylate, 2-hydroxyethyl acrylate, 2-hydroxypropyl acrylate, 2-hydroxybutyl acrylate, 2-hydroxymethyl methacrylate, 2-hydroxyethyl methacrylate, 2-hydroxypropyl methacrylate, and 2-hydroxybutyl methacrylate.

Of these hydroxyl group-containing monomers, hydroxyl group-containing (meth)acrylamide monomers are preferable from a viewpoint of further reducing residual water content in a heat-resistant layer and even further increasing heat shrinkage resistance of the heat-resistant layer while also improving cycle characteristics of a secondary battery, and N-hydroxyethylacrylamide and N-hydroxymethylacrylamide are more preferable. One hydroxyl group-containing monomer may be used individually, or two or more hydroxyl group-containing monomers may be used in combination.

Note that in the present disclosure, "(meth)acrylate" is used to indicate "acrylate" and/or "methacrylate".

The water-soluble polymer contained in the presently disclosed slurry composition for a heat-resistant layer is required to include a hydroxyl group-containing monomer unit. When the water-soluble polymer does not include a hydroxyl group-containing monomer unit, dispersion stability and coatability of the slurry composition for a heat-resistant layer decrease.

When the amount of all repeating units (all monomer units) in the water-soluble polymer is taken to be 100 mass %, the proportional content of the hydroxyl group-containing monomer unit in the water-soluble polymer is preferably 1 mass % or more, more preferably 3 mass % or more, and even more preferably 4 mass % or more, and is preferably 25 mass % or less, more preferably 21 mass % or less, even more preferably 18 mass % or less, and particularly preferably 17 mass % or less. When the proportional content of the hydroxyl group-containing monomer unit in the water-soluble polymer is 1 mass % or more, dispersion stability and coatability of the slurry composition for a heat-resistant layer can be further improved. On the other hand, when the proportional content of the hydroxyl group-containing monomer unit in the water-soluble polymer is 25 mass % or less, heat shrinkage resistance of a heat-resistant layer can be even further increased.

<<Other Repeating Units>>

No specific limitations are placed on other repeating units included in the water-soluble polymer. For example, the water-soluble polymer may include a monomer unit derived from a known monomer, such as a cross-linkable monomer unit or a (meth)acrylic acid ester monomer unit described further below in the "Non-conductive organic particles" section, as another repeating unit. Note that the water-soluble polymer may include one type of other repeating unit or may include two or more types of other repeating units.

When all repeating units (all monomer units) included in the water-soluble polymer are taken to be 100 mass %, the proportional content of other repeating units is preferably 10 mass % or less, more preferably 5 mass % or less, even more preferably 1 mass % or less, and particularly preferably 0 mass %.

<<Properties>>

[Hydroxyl Group/Acid Group Molar Ratio]

A molar ratio of the proportional content of the hydroxyl group-containing monomer unit relative to the proportional content of the acid group-containing monomer unit in the water-soluble polymer (i.e., the hydroxyl group/acid group molar ratio) is preferably 0.70 or more, more preferably 0.80 or more, and even more preferably 0.90 or more. When the hydroxyl group/acid group molar ratio is 0.70 or more, dispersion stability and coatability of the slurry composition for a heat-resistant layer can be further improved. The upper limit for the hydroxyl group/acid group molar ratio is not specifically limited and can, for example, be set as 5.00 or less, or as 3.00 or less.

[Weight-Average Molecular Weight]

The weight-average molecular weight of the water-soluble polymer used herein is preferably 200,000 or more, more preferably 300,000 or more, and even more preferably 400,000 or more, and is preferably 2,000,000 or less, more preferably 1,500,000 or less, and even more preferably 1,000,000 or less. When the weight-average molecular weight of the water-soluble polymer is 200,000 or more, heat shrinkage resistance of a heat-resistant layer can be even further increased because rigidity of the water-soluble polymer improves. On the other hand, when the weight-average molecular weight of the water-soluble polymer is 2,000,000 or less, coatability of the slurry composition for a heat-resistant layer can be further improved because viscosity of the slurry composition for a heat-resistant layer decreases.

Note that the weight-average molecular weight of a water-soluble polymer referred to in the present disclosure can be measured by gel permeation chromatography (GPC).

The weight-average molecular weight of the water-soluble polymer can be adjusted by altering the type and amount of a polymerization initiator and/or polymerization accelerator used in production of the water-soluble polymer, for example.

The water-soluble polymer contained in the presently disclosed slurry composition for a heat-resistant layer can interact with the non-conductive organic particles to a suitable degree, which enables good control of the proportion of the water-soluble polymer that is adsorbed to the non-conductive organic particles in the slurry composition for a heat-resistant layer. Moreover, through good control of the proportion of the water-soluble polymer that is adsorbed to the non-conductive organic particles, improvement of dispersion stability and coatability of the slurry composition for a heat-resistant layer and improvement of close adherence of a heat-resistant layer and a substrate are sufficiently achieved. From a viewpoint of further improving dispersion stability and coatability of the slurry composition for a heat-resistant layer while also increasing close adherence of a heat-resistant layer and a substrate, the proportion of the water-soluble polymer that is adsorbed to the non-conductive organic particles is preferably not less than 10 mass % and not more than 60 mass % when all of the water-soluble polymer in the slurry composition for a heat-resistant layer is taken to be 100 mass %. The method by which the proportion of the water-soluble polymer that is adsorbed to the non-conductive organic particles is measured may, for example, be a method in which the slurry composition for a heat-resistant layer is subjected to centrifugal separation, non-conductive organic particles to which the water-soluble polymer has adsorbed are subsequently caused to sediment, and then the weight loss behavior of the resultant sediment during heating is analyzed by Tg/DTA to thereby calculate the proportion of the water-soluble polymer that is adsorbed to the non-conductive organic particles or a method in which the slurry composition for a heat-resistant layer is subjected to centrifugal separation and the concentration of the water-soluble polymer in a supernatant is subsequently quantified to thereby calculate the proportion of the water-soluble polymer that is adsorbed to the non-conductive organic particles.

<<Production Method of Water-Soluble Polymer>>

The water-soluble polymer described above can, for example, be produced by any method among solution polymerization, suspension polymerization, bulk polymerization, emulsion polymerization, and the like without any specific limitations. Moreover, the polymerization method may be addition polymerization such as ionic polymerization, radical polymerization, or living radical polymerization. The polymerization may be carried out with a commonly used polymerization initiator, polymerization accelerator, emulsifier, dispersant, chain transfer agent, or the like, and the amount thereof may also be the same as commonly used. In particular, aqueous solution polymerization using water as a polymerization solvent is preferable because a solvent removal operation is not necessary, solvent safety is high, and a problem of mixing in of surfactant does not arise.

Note that in a case in which water is used as the polymerization solvent and the above-described monomer composition is polymerized in water to produce an aqueous solution containing the water-soluble polymer, the pH of the aqueous solution is preferably adjusted to not lower than 7 and not higher than 9 after polymerization. This is because it becomes easier to provide a slurry composition for a heat-resistant layer with good viscosity stability when the obtained aqueous solution is neutralized and adjusted to a pH that is within the range set forth above.

Examples of polymerization initiators that can be used in production of the water-soluble polymer include, without any specific limitations, known polymerization initiators such as sodium persulfate, ammonium persulfate, and potassium persulfate. Of these polymerization initiators, ammonium persulfate is preferable. One polymerization initiator may be used individually, or two or more polymerization initiators may be used in combination in a freely selected ratio.

Examples of polymerization accelerators that can be used include, without any specific limitations, known reducing polymerization accelerators such as L-ascorbic acid, sodium bisulfite, and tetramethylethylenediamine. Of these polymerization accelerators, L-ascorbic acid is preferable. One polymerization accelerator may be used individually, or two or more polymerization accelerators may be used in combination in a freely selected ratio.

<<Content>>

The content of the specific water-soluble polymer described above in the slurry composition for a heat-resistant layer is preferably 0.5 parts by mass or more, and more preferably 1 part by mass or more in terms of solid content per 100 parts by mass of the non-conductive organic particles from a viewpoint of even further increasing heat shrinkage resistance of a heat-resistant layer. Moreover, the content of the water-soluble polymer in the slurry composition for a heat-resistant layer is preferably 20 parts by mass or less, and more preferably 12 parts by mass or less in terms of solid content per 100 parts by mass of the non-conductive organic particles from a viewpoint of improving cycle characteristics of a secondary battery.

<<Non-Conductive Organic Particles>>

The non-conductive organic particles contained in the presently disclosed slurry composition for a heat-resistant layer are particles used as non-conductive particles that can increase heat resistance and strength of a heat-resistant layer and are normally formed of a polymer that does not have binding capacity. By using the non-conductive organic particles as non-conductive particles, it is possible to reduce residual water content in a heat-resistant layer as compared to a case in which non-conductive inorganic particles such as alumina are used as previously described. Moreover, by using the non-conductive organic particles as non-conductive particles, it is possible to reduce metal abrasion that can occur in a situation in which non-conductive inorganic particles are used and to suppress metal contamination.

Note that the non-conductive organic particles are water-insoluble particles that are formed of a specific polymer. Also note that when particles are referred to as "water-insoluble" in the present disclosure, this means that when 0.5 g of the polymer is dissolved in 100 g of water at a temperature of 25° C., insoluble content is 90 mass % or more.

The non-conductive organic particles include a cross-linkable monomer unit in a proportion that is within a specific range and may include monomer units other than the cross-linkable monomer unit. Examples of such monomer units other than the cross-linkable monomer unit include, but are not specifically limited to, a (meth)acrylic acid ester monomer unit, a hydrophilic group-containing monomer unit, and monomer units other than the cross-linkable monomer unit, (meth)acrylic acid ester monomer unit, and hydrophilic group-containing monomer unit (i.e., other monomer units). Note that one type of non-conductive organic particles may be used individually, or two or more types of non-conductive organic particles may be used in combination in a freely selected ratio.

<<Cross-Linkable Monomer Unit>>

A cross-linkable monomer that can form the cross-linkable monomer unit is a monomer that includes two or more polymerizable double bonds (for example, olefinic double bonds) per molecule. Examples of cross-linkable monomers that may be used include polyfunctional (meth)acrylates such as allyl (meth)acrylate, ethylene di(meth)acrylate, ethylene glycol di(meth)acrylate, diethylene glycol di(meth)acrylate, triethylene glycol di(meth)acrylate, tetraethyl ene glycol di(meth)acrylate, and trimethylolpropane tri(meth)acrylate; polyfunctional allyl/vinyl ethers such as dipropylene glycol diallyl ether, polyglycol diallyl ether, triethylene glycol divinyl ether, hydroquinone diallyl ether, and tetraallyloxyethane; divinylbenzene; vinyl glycidyl ether; allyl glycidyl ether; methylolacrylamide; and acrylamide.

Of these cross-linkable monomers, polyfunctional (meth)acrylates are preferable from a viewpoint of further improving heat shrinkage resistance of a heat-resistant layer, with ethylene glycol dimethacrylate being more preferable. One of the cross-linkable monomers described above may be used individually, or two or more of the cross-linkable monomers described above may be used in combination.

When the amount of all repeating units (all monomer units) in the non-conductive organic particles used herein is taken to be 100 mass %, the proportional content of the cross-linkable monomer unit in the non-conductive organic particles is required to be not less than 20 mass % and not more than 95 mass %. Moreover, the proportional content of the cross-linkable monomer unit in the non-conductive organic particles is preferably 25 mass % or more, more preferably 30 mass % or more, even more preferably 50 mass % or more, and particularly preferably 60 mass % or more, and is preferably 90 mass % or less, and more preferably 85 mass % or less. When the proportional content of the cross-linkable monomer unit in the non-conductive organic particles is less than 20 mass %, dispersion stability of the slurry composition for a heat-resistant layer and heat shrinkage resistance of a heat-resistant layer cannot be sufficiently achieved because the hardness of the non-conductive organic particles decreases. On the other hand, when the proportional content of the cross-linkable monomer unit in the non-conductive organic particles is more than 95 mass %, polymerization stability of the non-conductive organic particles cannot be sufficiently ensured, and dispersion stability of the slurry composition for a heat-resistant layer decreases.

<<(Meth)Acrylic Acid Ester Monomer Unit>>

Examples of (meth)acrylic acid ester monomers that can form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, and 2-ethylhexyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, and 2-ethylhexyl methacrylate. One of these (meth)acrylic acid ester monomers may be used individually, or two or more of these (meth)acrylic acid ester monomers may be used in combination. Of these examples, n-butyl acrylate is preferable as a (meth)acrylic acid ester monomer.

The proportional content of the (meth)acrylic acid ester monomer unit in the non-conductive organic particles when the amount of all repeating units (all monomer units) in the non-conductive organic particles is taken to be 100 mass % is preferably 1 mass % or more, more preferably 5 mass % or more, and even more preferably 10 mass % or more, and is preferably 75 mass % or less, more preferably 50 mass % or less, and even more preferably 30 mass % or less. When the proportional content of the (meth)acrylic acid ester monomer unit in the non-conductive organic particles is 1 mass % or more, polymerization stability of the non-conductive organic particles can be sufficiently ensured. On the other hand, when the proportional content of the (meth)acrylic acid ester monomer unit is 75 mass % or less, dispersion stability of the slurry composition for a heat-resistant layer and heat shrinkage resistance of a heat-resistant layer can be even further increased because the hardness of the non-conductive organic particles improves.

<<Hydrophilic Group-Containing Monomer Unit>>

Examples of hydrophilic group-containing monomers that can form the hydrophilic group-containing monomer unit include the "acid group-containing monomers" and "hydroxyl group-containing monomers" described in the "Water-soluble polymer" section. One of these hydrophilic group-containing monomers may be used individually, or two or more of these hydrophilic group-containing monomers may be used in combination. Of these examples, acrylic acid is preferable as a hydrophilic group-containing monomer.

The proportional content of the hydrophilic group-containing monomer unit in the non-conductive organic particles when the amount of all repeating units (all monomer units) in the non-conductive organic particles is taken to be 100 mass % is preferably 0.1 mass % or more, more preferably 0.5 mass % or more, and even more preferably 1 mass % or more, and is preferably 5 mass % or less, and more preferably 3 mass % or less. When the proportional content of the hydrophilic group-containing monomer unit in the non-conductive organic particles is 0.1 mass % or more, polymerization stability of the non-conductive organic particles can be sufficiently ensured. On the other hand, when the proportional content of the hydrophilic group-containing monomer unit in the non-conductive organic particles is 5 mass % or less, dispersion stability of the slurry composition for a heat-resistant layer and heat shrinkage resistance of a heat-resistant layer can be even further increased because the hardness of the non-conductive organic particles improves.

<<Other Monomer Units>>

Examples of other monomers that can form other monomer units include monomers other than the cross-linkable monomers, (meth)acrylic acid ester monomers, and hydrophilic group-containing monomers described above without any specific limitations. Specific examples of such other monomers include α,β-unsaturated nitrile monomers such as acrylonitrile and methacrylonitrile; and styrenic monomers such as styrene, chlorostyrene, vinyltoluene, t-butylstyrene, methyl vinylbenzoate, vinylnaphthalene, chloromethylstyrene, and α-methylstyrene. One of these other monomers may be used individually, or two or more of these other monomers may be used in combination.

The proportional content of other monomer units in the non-conductive organic particles when the amount of all repeating units (all monomer units) in the non-conductive organic particles is taken to be 100 mass % is preferably 5 mass % or less, more preferably 1 mass % or less, and even more preferably 0 mass %.

<<Properties>>

[Glass-Transition Temperature]

The glass-transition temperature of the non-conductive organic particles is preferably 110° C. or higher, more preferably 150° C. or higher, and even more preferably 200° C. or higher. When the glass-transition temperature of the non-conductive organic particles is 110° C. or higher, dispersion stability of the slurry composition for a heat-resistant layer can be further improved while also even further increasing heat shrinkage resistance of a heat-resistant layer. In addition, cycle characteristics of a secondary battery can be improved. The upper limit for the glass-transition temperature of the non-conductive organic particles is not specifically limited and can, for example, be set as 400° C. or lower, or as 300° C. or lower.

The glass-transition temperature of the non-conductive organic particles can be adjusted by altering the type and/or amount of a monomer, polymerization initiator, and/or polymerization accelerator used in production of the non-conductive organic particles, for example.

[Volume-Average Particle Diameter]

The volume-average particle diameter of the non-conductive organic particles is preferably 0.05 μm or more, more preferably 0.08 μm or more, and even more preferably 0.1 μm or more, and is preferably 0.5 μm or less, and more preferably 0.4 μm or less. When the volume-average particle diameter of the non-conductive organic particles is 0.05 μm or more, residual water content in a heat-resistant layer can be further reduced while also improving cycle characteristics of a secondary battery. On the other hand, when the volume-average particle diameter of the non-conductive organic particles is 0.5 μm or less, a heat-resistant layer can be densified, and heat shrinkage resistance of the heat-resistant layer can be even further increased.

Note that the "volume-average particle diameter" referred to in the present disclosure is the "particle diameter (D50) at which, in a particle size distribution (by volume) measured by laser diffraction, cumulative volume calculated from a small diameter end of the distribution reaches 50%".

The volume-average particle diameter of the non-conductive organic particles can be adjusted by altering the type and/or amount of a monomer, polymerization initiator, and/or polymerization accelerator used in production of the non-conductive organic particles, for example.

<<Production Method of Non-Conductive Organic Particles>>

The method by which the non-conductive organic particles are produced is not specifically limited and may, for example, be any of solution polymerization, suspension polymerization, bulk polymerization, emulsion polymerization, or the like. Moreover, the polymerization reaction may be addition polymerization such as ionic polymerization, radical polymerization, or living radical polymerization. In the polymerization, seed particles may be used to perform seeded polymerization. The polymerization may be carried out with a commonly used polymerization solvent, emulsifier, dispersant, polymerization initiator, chain transfer agent, or the like, and the amount thereof may also be the same as commonly used.

Examples of polymerization initiators that can be used in production of the non-conductive organic particles include, without any specific limitations, known polymerization initiators such as sodium persulfate, ammonium persulfate, potassium persulfate, and t-butyl peroxy-2-ethylhexanoate. Of these polymerization initiators, t-butyl peroxy-2-ethylhexanoate is preferable. One polymerization initiator may be used individually, or two or more polymerization initiators may be used in combination in a freely selected ratio.

<Particulate Polymer>

The particulate polymer that can optionally be contained in the presently disclosed slurry composition for a heat-resistant layer is a component that functions as a binder in the same manner as the water-soluble polymer described above and is normally formed of a polymer having binding capacity. The inclusion of a particulate polymer in the slurry composition for a heat-resistant layer can improve close adherence of an obtained heat-resistant layer and a substrate.

The particulate polymer is water-insoluble particles that are formed of a specific polymer.

The particulate polymer is not specifically limited so long as it is a particulate polymer that is water-insoluble and can be dispersed in a dispersion medium such as water. For example, a conjugated diene polymer, a fluoropolymer, or an acrylic polymer can be used as the particulate polymer. Of these examples, it is preferable to use an acrylic polymer. By using an acrylic polymer as a particulate polymer contained in the slurry composition for a heat-resistant layer, it is possible to improve close adherence of a heat-resistant layer and a substrate and also to increase oxidation resistance of a battery member that includes the heat-resistant layer. Note that one particulate polymer may be used individually, or two or more particulate polymers may be used in combination in a freely selected ratio.

<<Conjugated Diene Polymer>>

A conjugated diene polymer is a polymer that includes a conjugated diene monomer unit. Specific examples of conjugated diene polymers include, but are not specifically limited to, copolymers that include an aromatic vinyl monomer unit and an aliphatic conjugated diene monomer unit (styrene-butadiene copolymer (SBR), etc.), butadiene rubber (BR), isoprene rubber, acrylic rubber (NBR) (copolymer including an acrylonitrile unit and a butadiene unit), and hydrogenated products of any thereof.

<<Fluoropolymer>>

Specific examples of fluoropolymers include, but are not specifically limited to, polyvinylidene fluoride (PVdF) and polyvinylidene fluoride-hexafluoropropylene (PVdF-HFP) copolymer.

<<Acrylic Polymer>>

An acrylic polymer is a polymer that includes a (meth)acrylic acid ester monomer unit. The acrylic polymer may also include repeating units other than the (meth)acrylic acid ester monomer unit. Although a hydrophilic group-containing monomer unit and a cross-linkable monomer unit are preferable as such other repeating units, no specific limitations are made and monomer units other than a (meth)acrylic acid ester monomer unit, a hydrophilic group—containing monomer unit, and a cross-linkable monomer unit (i.e., other monomer units) may be included.

[(Meth)Acrylic Acid Ester Monomer Unit]

Examples of (meth)acrylic acid ester monomers that can form the (meth)acrylic acid ester monomer unit include those described in the "Non-conductive organic particles" section. One of these (meth)acrylic acid ester monomers may be used individually, or two or more of these (meth)acrylic acid ester monomers may be used in combination. Of these examples, n-butyl acrylate and 2-ethylhexyl acrylate are preferable as (meth)acrylic acid ester monomers.

The proportional content of the (meth)acrylic acid ester monomer unit in the particulate polymer when the amount of all repeating units (all monomer units) in the particulate polymer is taken to be 100 mass % is preferably more than 50 mass %, and more preferably 60 mass % or more, and is preferably 99 mass % or less, and more preferably 97 mass % or less.

[Hydrophilic Group-Containing Monomer Unit]

Examples of hydrophilic group-containing monomers that can form the hydrophilic group-containing monomer unit include those described in the "Non-conductive organic particles" section. One of these hydrophilic group-containing monomers may be used individually, or two or more of these hydrophilic group-containing monomers may be used in combination. Of these examples, methacrylic acid is preferable as a hydrophilic group-containing monomer.

The proportional content of the hydrophilic group-containing monomer unit in the particulate polymer when the amount of all repeating units (all monomer units) in the particulate polymer is taken to be 100 mass % is preferably 1 mass % or more, and is preferably 5 mass % or less.

[Cross-Linkable Monomer Unit]

Examples of cross-linkable monomers that can form the cross-linkable monomer unit include those described in the "Non-conductive organic particles" section. One of these cross-linkable monomers may be used individually, or two or more of these cross-linkable monomers may be used in combination. Of these examples, allyl glycidyl ether and polyfunctional (meth)acrylates are preferable, and allyl glycidyl ether and allyl methacrylate are more preferable as cross-linkable monomers.

The proportional content of the cross-linkable monomer unit in the particulate polymer when the amount of all repeating units (all monomer units) in the particulate polymer is taken to be 100 mass % is preferably 0.001 mass % or more, and more preferably 0.01 mass % or more, and is preferably 10 mass % or less, and more preferably 5 mass % or less. Excessive swelling of the particulate polymer in electrolyte solution can be inhibited and cycle characteristics of a secondary battery can be improved when the proportional content of the cross-linkable monomer unit in the particulate polymer is 0.001 mass % or more, whereas binding capacity of the particulate polymer can be sufficiently ensured when the proportional content of the cross-linkable monomer unit in the particulate polymer is 10 mass % or less.

[Other Monomer Units]

Examples of other monomers that can form other monomer units include monomers other than the (meth)acrylic acid ester monomers, hydrophilic group-containing monomers, and cross-linkable monomers described above without any specific limitations. Specifically, examples of such other monomers include those described in the "Non-conductive organic particles" section. One of these other monomers may be used individually, or two or more of these other monomers may be used in combination. Of these examples, acrylonitrile and styrene are preferable as other monomers.

The proportional content of other monomer units in the particulate polymer when the amount of all repeating units (all monomer units) in the particulate polymer is taken to be 100 mass % is preferably 1 mass % or more, and is preferably 35 mass % or less, and more preferably 5 mass % or less.

<<Properties>>

[Glass-Transition Temperature]

The glass-transition temperature of the particulate polymer is preferably lower than 20° C., and more preferably lower than 15° C. When the glass-transition temperature of the particulate polymer is lower than 20° C., close adherence of a heat-resistant layer and a substrate can be improved. Moreover, the lower limit for the glass-transition temperature of the particulate polymer is not specifically limited and can be set as higher than −120° C. or as higher than −60° C., for example.

The glass-transition temperature of the particulate polymer can be adjusted by altering the type and/or amount of a monomer, polymerization initiator, and/or polymerization accelerator used in production of the particulate polymer, for example.

[Volume-Average Particle Diameter]

The volume-average particle diameter of the particulate polymer is preferably 0.05 μm or more, and more preferably 0.1 μm or more, and is preferably 1 μm or less, and more preferably 0.5 μm or less. When the volume-average particle diameter of the particulate polymer is 0.05 μm or more, cycle characteristics of a secondary battery can be improved. On the other hand, when the volume-average particle diameter of the particulate polymer is 1 μm or less, close adherence of a heat-resistant layer and a substrate can be improved.

The volume-average particle diameter of the particulate polymer can be adjusted by altering the type and/or amount of a monomer, polymerization initiator, and/or polymerization accelerator used in production of the particulate polymer, for example.

<<Production Method of Particulate Polymer>>

The polymerization method of the particulate polymer is not specifically limited and may, for example, be any of solution polymerization, suspension polymerization, bulk polymerization, emulsion polymerization, or the like. Moreover, the polymerization reaction may be addition polymerization such as ionic polymerization, radical polymerization, or living radical polymerization. The polymerization may be carried out with a commonly used polymerization solvent, emulsifier, dispersant, polymerization initiator, chain transfer agent, or the like, and the amount thereof may also be the same as commonly used.

<<Content>>

From a viewpoint of improving close adherence of a heat-resistant layer and a substrate, the content of the above-described particulate polymer in the slurry composition for a heat-resistant layer is preferably 1 part by mass or more, more preferably 1.2 parts by mass or more, and even more preferably 1.4 parts by mass or more in terms of solid content per 100 parts by mass of the non-conductive organic particles. Moreover, from a viewpoint of improving cycle characteristics of a secondary battery, the content of the particulate polymer in the slurry composition for a heat-resistant layer is preferably 20 parts by mass or less, more preferably 15 parts by mass or less, and even more preferably 10 parts by mass or less in terms of solid content per 100 parts by mass of the non-conductive organic particles.

<Dispersion Medium>

The dispersion medium of the presently disclosed slurry composition for a heat-resistant layer is not specifically limited so long as it includes water. For example, the presently disclosed slurry composition for a heat-resistant layer may contain just water as the dispersion medium or may contain a mixture of water and an organic solvent (for example, an ester, ketone, or alcohol) as the dispersion medium. Note that the presently disclosed slurry composition for a heat-resistant layer may contain one organic solvent or may contain two or more organic solvents.

<Other Components>

Besides the components described above, the presently disclosed slurry composition for a heat-resistant layer may contain reinforcing materials, leveling agents, wetting agents, non-conductive inorganic particles, dispersants, viscosity modifiers, additives for electrolyte solution, preservatives, fungicides, defoamers, polymerization inhibitors, and binders other than the water-soluble polymer and the particulate polymer according to the present disclosure. Commonly known examples of such components can be used without any specific limitations so long as they do not affect battery reactions. One other component may be used individually, or two or more other components may be used in combination in a freely selected ratio.

Examples of wetting agents that can be used include, but are not specifically limited to, ethylene oxide/propylene oxide surfactants (EO/PO surfactants), fluorine-containing surfactants, silicon-containing surfactants, and so forth. Of these wetting agents, EO/PO surfactants and fluorine-containing surfactants are preferable, and EO/PO surfactants are more preferable.

The content of the wetting agent described above in the slurry composition for a heat-resistant layer is preferably 0.05 parts by mass or more, more preferably 0.1 parts by mass or more, and even more preferably 0.3 parts by mass or more per 100 parts by mass of the non-conductive organic particles, and is preferably 5 parts by mass or less, more preferably 3 parts by mass or less, and even more preferably 1 part by mass or less per 100 parts by mass of the non-conductive organic particles. When the content of the wetting agent is 0.05 parts by mass or more per 100 parts by mass of the non-conductive organic particles, coatability of the slurry composition for a heat-resistant layer can be even further increased because wettability with respect to a substrate improves, and the occurrence of cissing is inhibited. Moreover, when the content of the wetting agent is 5 parts by mass or less per 100 parts by mass of the non-conductive organic particles, cycle characteristics of a secondary battery can be improved.

Any particles formed of an inorganic material that is electrochemically stable and is stably present in the environment of use of a secondary battery may be used as non-conductive inorganic particles without any specific limitations. Examples of non-conductive inorganic particles that are preferable from such a viewpoint include particles of inorganic oxides such as aluminum oxide (alumina, $Al_2O_3$), hydrous aluminum oxide (boehmite, AlOOH), gibbsite (Al(OH)$_3$), silicon oxide, magnesium oxide (magnesia), magnesium hydroxide, calcium oxide, titanium oxide (titania), barium titanate ($BaTiO_3$), ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. Of these examples, particles formed of alumina (alumina particles), particles formed of boehmite (boehmite particles), and particles formed of barium sulfate (barium sulfate particles) are preferable as the non-conductive inorganic particles from a viewpoint of causing good adsorption of the water-soluble polymer and the particulate polymer and improving close adherence of a heat-resistant layer and a substrate, and alumina particles and barium sulfate particles are more preferable as the non-conductive inorganic particles.

These particles may be subjected to element substitution, surface treatment, solid solution treatment, or the like as necessary. One of these types of particles may be used individually, or two or more of these types of particles may be used in combination.

From a viewpoint of even further reducing residual water content in a heat-resistant layer and improving cycle characteristics of a secondary battery, the content of the non-conductive inorganic particles described above in the slurry composition for a heat-resistant layer is preferably 600 parts by mass or less, and more preferably 400 parts by mass or less in terms of solid content per 100 parts by mass of the non-conductive organic particles. Moreover, the lower limit for the content of the non-conductive inorganic particles described above in the slurry composition for a heat-resistant layer is not specifically limited. For example, the content of the non-conductive inorganic particles is 0 parts by mass or more, and may be set as 100 parts by mass or more, or as 200 parts by mass or more in terms of solid content per 100 parts by mass of the non-conductive organic particles.

Specific examples of other components besides the wetting agents and non-conductive inorganic particles described above include, but are not specifically limited to, those described in WO2012/115096A1, for example.

<Production of Slurry Composition for Non-Aqueous Secondary Battery Heat-Resistant Layer>

The presently disclosed slurry composition for a heat-resistant layer can be produced by using a known method to mix the previously described water-soluble polymer, non-conductive organic particles, and water, and also the particulate polymer and other components that are optionally used. Specifically, the slurry composition for a heat-resistant layer can be produced by mixing the above-described components using a mixer such as a ball mill, a sand mill, a bead mill, a pigment disperser, a grinding machine, an ultrasonic disperser, a homogenizer, a planetary mixer, or a FILMIX.

Note that in a case in which the water-soluble polymer, the non-conductive organic particles, or the optional particulate polymer is produced through polymerization in an aqueous solvent, the water-soluble polymer, non-conductive organic particles, or particulate polymer may be mixed while still in the form of an aqueous solution or water dispersion so as to produce the slurry composition for a heat-resistant layer containing water as a solvent.

(Heat-Resistant Layer for Non-Aqueous Secondary Battery)

The presently disclosed heat-resistant layer is a layer that is formed from the presently disclosed slurry composition for a heat-resistant layer set forth above. For example, the presently disclosed heat-resistant layer can be formed by applying the slurry composition for a heat-resistant layer set forth above onto the surface of a suitable substrate to form a coating film, and subsequently drying the coating film that has been formed. In other words, the presently disclosed heat-resistant layer is formed of a dried product of the slurry composition for a heat-resistant layer set forth above and normally contains at least non-conductive organic particles and a water-soluble polymer. Note that components contained in the heat-resistant layer are components that were contained in the slurry composition for a heat-resistant layer set forth above, and thus the preferred ratio of these components is the same as the preferred ratio of the components in the slurry composition for a heat-resistant layer.

The presently disclosed heat-resistant layer has excellent heat shrinkage resistance and low residual water content as a result of being formed from the presently disclosed slurry composition for a heat-resistant layer.

<Substrate>

No limitations are placed on the substrate onto which the slurry composition for a heat-resistant layer is applied. For example, a coating film of the slurry composition for a heat-resistant layer may be formed on the surface of a releasable substrate, this coating film may be dried to form a heat-resistant layer, and then the releasable substrate may be peeled from the heat-resistant layer. The heat-resistant layer that is peeled from the releasable substrate in this manner can be used as a free-standing film in formation of a battery member of a secondary battery.

However, it is preferable that a separator substrate or an electrode substrate is used as the substrate from a viewpoint of raising battery member production efficiency since a step of peeling the heat-resistant layer can be omitted. Specifically, the slurry composition for a heat-resistant layer is preferably applied onto a separator substrate or an electrode substrate.

<<Separator Substrate>>

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, an aromatic polyamide resin, or the like, and is preferably a microporous membrane or non-woven fabric made from polyethylene due to the excellent strength thereof.

<<Electrode Substrate>>

The electrode substrate (positive electrode substrate or negative electrode substrate) is not specifically limited and may, for example, be an electrode substrate obtained by forming an electrode mixed material layer containing an electrode active material and a binder on a current collector.

The current collector, the electrode active material (positive electrode active material or negative electrode active material) and the binder for an electrode mixed material layer (binder for a positive electrode mixed material layer or binder for a negative electrode mixed material layer) in the electrode mixed material layer, and the method by which the electrode mixed material layer is formed on the current collector can be known examples thereof such as any of those described in JP2013-145763A, for example.

<Formation Method of Heat-Resistant Layer>

Examples of methods by which the heat-resistant layer may be formed on a substrate such as the separator substrate or the electrode substrate described above include:
  (1) a method in which the presently disclosed slurry composition for a heat-resistant layer is applied onto the surface of the substrate (surface at the electrode mixed material layer-side in the case of the electrode substrate; same applies below) and is then dried;
  (2) a method in which the substrate is immersed in the presently disclosed slurry composition for a heat-resistant layer and is then dried; and
  (3) a method in which the presently disclosed slurry composition for a heat-resistant layer is applied onto a releasable substrate and is dried to produce a heat-resistant layer that is then transferred onto the surface of the substrate.

Of these methods, method (1) is particularly preferable since it allows simple control of the thickness of the heat-resistant layer. In more detail, method (1) includes a step of applying the slurry composition for a heat-resistant layer onto the substrate (application step) and a step of drying the slurry composition for a heat-resistant layer that has been applied onto the substrate to form a heat-resistant layer (drying step).

<<Application Step>>

Examples of methods by which the slurry composition for a heat-resistant layer can be applied onto the substrate in the application step include, but are not specifically limited to, doctor blading, reverse roll coating, direct roll coating, gravure coating, extrusion coating, and brush coating.

<<Drying Step>>

The method by which the slurry composition for a heat-resistant layer on the substrate is dried in the drying step may be a commonly known method without any specific limitations. Examples of drying methods that may be used include drying by warm, hot, or low-humidity air, drying in a vacuum, and drying through irradiation with infrared light, electron beams, or the like.

(Non-Aqueous Secondary Battery)

The presently disclosed secondary battery includes the presently disclosed heat-resistant layer set forth above. More specifically, the presently disclosed secondary battery includes a positive electrode, a negative electrode, a separator, and an electrolyte solution, and has the heat-resistant layer set forth above included in at least one battery member among the positive electrode, the negative electrode, and the separator.

<Positive Electrode, Negative Electrode, and Separator>

At least one of the positive electrode, the negative electrode, and the separator used in the presently disclosed secondary battery is a battery member that includes the presently disclosed heat-resistant layer set forth above. Note that any known positive electrode, negative electrode, or separator can be used without any specific limitations as a positive electrode, negative electrode, or separator that does not include the presently disclosed heat-resistant layer.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used in a lithium ion secondary battery, for example, include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

The concentration of the electrolyte in the electrolyte solution may be adjusted as appropriate. Furthermore, known additives may be added to the electrolyte solution.

<Production Method of Non-Aqueous Secondary Battery>

The presently disclosed non-aqueous secondary battery may be produced, for example, by stacking the positive electrode and the negative electrode with the separator in-between, performing rolling, folding, or the like of the resultant laminate as necessary in accordance with the battery shape, placing the laminate in a battery container, injecting the electrolyte solution into the battery container, and sealing the battery container. Note that at least one member among the positive electrode, the negative electrode, and the separator is a member that is equipped with a heat-resistant layer. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the case of a polymer that is produced through polymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer. Moreover, in the examples and comparative examples, the following methods were used to evaluate the weight-average molecular weight of a water-soluble polymer, the glass-transition temperature and volume-average particle diameter of non-conductive organic particles and a particulate polymer, the dispersion stability and coatability of a slurry composition for a heat-resistant layer, the water content and heat shrinkage resistance of a heat-resistant layer, and the cycle characteristics of a secondary battery.

<Weight-Average Molecular Weight of Water-Soluble Polymer>

An aqueous solution containing a water-soluble polymer that was produced in each example or comparative example was diluted so as to adjust the concentration thereof to 0.5%. Next, caustic soda was added until the pH reached 10 to 12, 1 hour of immersion was performed in a hot water bath of 80° C. or higher, and then dilution to 0.025% was performed with the eluent indicated below so as to prepare a sample. The sample was analyzed by gel permeation chromatography under the following conditions in order to determine the weight-average molecular weight of the water-soluble polymer.

Apparatus: Gel permeation chromatograph GPC (device No. GPC-26)
 Detector: Differential refractive index detector RI (produced by Showa Denko K.K.; product name: RI-201; sensitivity: 32)
 Column: TSKgel GMPWXL×2 (Ø7.8 mm×30 cm; produced by Tosoh Corporation)

Eluent: 0.1 M Tris buffer solution (pH 9; 0.1 M potassium chloride added)

Flow rate: 0.7 mL/min

Column temperature: 40° C.

Injection volume: 0.2 mL

Reference sample: Monodisperse polyethylene oxide (PEO) and polyethylene glycol (PEG) produced by Tosoh Corporation and Sigma-Aldrich <Glass-Transition Temperature of Non-Conductive Organic Particles and Particulate Polymer>

A powdered sample obtained by drying a water dispersion containing non-conductive organic particles or a particulate polymer at a temperature of 25° C. for 48 hours was used as a measurement sample. After weighing 10 mg of the measurement sample into an aluminum pan, measurement was implemented under conditions prescribed in JIS Z8703 using a differential scanning calorimeter (produced by SII NanoTechnology Inc.; product name: EXSTAR DSC6220) and with a measurement temperature range of −100° C. to 200° C. and a heating rate of 20° C./min to obtain a differential scanning calorimetry (DSC) curve. Note that an empty aluminum pan was used as a reference. The temperature at which a derivative signal (DDSC) exhibited a peak in the heating process was taken to be the glass-transition temperature (° C.). Note that in a case in which multiple peaks were measured, the temperature at which a peak having large displacement was exhibited was taken to be the glass-transition temperature of the non-conductive organic particles or particulate polymer. Also note that in a case in which a peak was not observed in the measurement temperature range (−100° C. to 200° C.), the glass-transition temperature was judged to be higher than 200° C.

<Volume-Average Particle Diameter of Non-Conductive Organic Particles and Particulate Polymer>

The volume-average particle diameter of non-conductive organic particles or a particulate polymer was measured by laser diffraction. Specifically, a produced water dispersion containing the non-conductive organic particles or particulate polymer (adjusted to a solid content concentration of 0.1 mass %) was used as a sample. In a particle diameter distribution (by volume) measured using a laser diffraction particle size analyzer (produced by Beckman Coulter Inc.; product name: LS-13 320), the particle diameter D50 at which cumulative volume calculated from a small diameter end of the distribution reached 50% was taken to be the volume-average particle diameter.

<Dispersion Stability of Slurry Composition for Heat-Resistant Layer>

After loading 1 kg of a slurry composition for a heat-resistant layer produced in each example or comparative example into a 1 L plastic bottle, the plastic bottle was left at rest for 10 days. A Mix Rotor was then used to perform 30 minutes of stirring of the entire plastic bottle that had been left at rest. After this stirring, the slurry composition for a heat-resistant layer inside the plastic bottle was sampled at within 1 cm of the top, and the solid content concentration of the sampled supernatant was measured. The slurry composition for a heat-resistant layer in the plastic bottle after stirring was withdrawn from the bottle, and occurrence of adhesion to the bottom of the plastic bottle was checked. An evaluation was made as follows.

A: Solid content concentration of supernatant after stirring of 39.5% or more and no adhesion to bottom of plastic bottle B: Solid content concentration of supernatant after stirring of 39.5% or more but adhesion to bottom of plastic bottle observed C: Solid content concentration of supernatant after stirring of less than 39.5%

<Coatability of Slurry Composition for Heat-Resistant Layer>

The external appearance of heat-resistant layers at both sides that were formed from a slurry composition for a heat-resistant layer produced in each example or comparative example were visually observed, and each side was evaluated as follows. In addition, the lower of these evaluations was taken as an overall evaluation for coatability of the slurry composition for a heat-resistant layer.

A: Range over which aggregates, streaks, and/or cissing are not observed is 30 cm×30 cm or more B: Range over which aggregates, streaks, and/or cissing are not observed is not less than 10 cm×10 cm and less than 30 cm×30 cm C: Range over which aggregates, streaks, and/or cissing are not observed is less than 10 cm×10 cm <Water Content of Heat-Resistant Layer>

A heat-resistant layer-equipped separator produced in each example or comparative example was cut out as 10 cm in width by 10 cm in length to obtain a test specimen. This test specimen was left at a temperature of 25° C. and a dew point of −60° C. for 24 hours. Thereafter, the water content of the test specimen was measured by the Karl Fischer method (water vaporization method of HS K-0068(2001); vaporization temperature: 150° C.) using a coulometric titration water meter and was evaluated by the following standard. A smaller value for the water content indicates that the test specimen as a whole and the heat-resistant layer have lower water content.

A: Water content of less than 300 mass ppm

B: Water content of not less than 300 mass ppm and less than 500 mass ppm

C: Water content 500 mass ppm or more

<Heat Shrinkage Resistance of Heat-Resistant Layer>

A heat-resistant layer-equipped separator produced in each example or comparative example was cut out as a square of 12 cm in width by 12 cm in length, and a square having a side length of 10 cm was drawn in an inner part of the cut out square to obtain a test specimen. The test specimen was placed inside a 150° C. thermostatic tank and was left for 1 hour. Thereafter, the area change of the square drawn in the inner part (={(area of square before being left−area of square after being left)/area of square before being left}×100%) was determined as the heat shrinkage rate and was evaluated by the following standard. A smaller heat shrinkage rate indicates that a heat-resistant layer has better heat shrinkage resistance.

A: Heat shrinkage rate of less than 10%

B: Heat shrinkage rate of not less than 10% and less than 20%

C: Heat shrinkage rate of 20% or more

<Cycle Characteristics of Secondary Battery>

A lithium ion secondary battery produced in each example or comparative example was left at rest in a 25° C. environment for 24 hours. Thereafter, the lithium ion secondary battery was subjected to a charge/discharge operation of charging to 4.2 V (cut-off condition: 0.02 C) by a constant current-constant voltage (CC-CV) method at a charge rate of 1 C and then discharging to 3.0 V by a constant current (CC) method at a discharge rate of 1 C at 25° C., and the initial capacity C0 was measured.

The lithium ion secondary battery was repeatedly subjected to the same charge/discharge operation in a 25° C. environment, and the capacity C1 after 300 cycles was measured. The capacity maintenance rate ΔC (=(C1/C0)×

100(%)) was calculated and was evaluated by the following standard. A higher capacity maintenance rate indicates a smaller decrease of discharge capacity, and thus indicates better cycle characteristics.
 A: Capacity maintenance rate ΔC of 85% or more
 B: Capacity maintenance rate ΔC of not less than 75% and less than 85%
 C: Capacity maintenance rate ΔC of less than 75%

Example 1

<Production of Aqueous Solution Containing Water-Soluble Polymer>

A 10 L septum-equipped flask was charged with 6,335 g of deionized water and 190 g of a 2.0% aqueous solution of L-ascorbic acid as a polymerization accelerator. These materials were heated to a temperature of 40° C., and the inside of the flask was purged with nitrogen gas at a flow rate of 100 mL/min. Next, 939.8 g (74.0%) of acrylamide as an amide group-containing monomer, 127.0 g (10.0%) of acrylic acid as an acid group-containing monomer, and 203.2 g (16.0%) of N-hydroxyethylacrylamide as a hydroxyl group-containing monomer were mixed and were then injected into the flask by a syringe. Thereafter, 200 g of a 5.0% aqueous solution of ammonium persulfate as a polymerization initiator was added into the flask by a syringe, and the reaction temperature was set to 60° C. Once 2 hours had passed, 100 g of a 5.0% aqueous solution of ammonium persulfate as a polymerization initiator and 95 g of a 2.0% aqueous solution of L-ascorbic acid as a polymerization accelerator were added in order to further raise the reaction conversion rate. Once a further 2 hours had passed, 100 g of a 5.0% aqueous solution of ammonium persulfate as a polymerization initiator and 95 g of a 2.0% aqueous solution of L-ascorbic acid as a polymerization accelerator were added. Two hours later, 34 g of a 5% aqueous solution of sodium nitrite as a reaction inhibitor was added into the flask and was stirred. Thereafter, the flask was cooled to 40° C. and was converted to an air atmosphere. The pH of the system was adjusted to 8.0 using 8% lithium hydroxide aqueous solution to thereby yield an aqueous solution containing a water-soluble polymer.

The weight-average molecular weight of the obtained water-soluble polymer was measured. The result is shown in Table 1.

<Production of Water Dispersion Containing Non-Conductive Organic Particles>

A reactor A including a stirrer was charged with 0.1 parts of sodium dodecylbenzenesulfonate, 0.3 parts of ammonium persulfate, and 100 parts of deionized water. These materials were mixed to obtain a mixture and were heated to 80° C. Meanwhile, a monomer composition for seed particles was produced in a separate vessel by mixing 100 parts of n-butyl acrylate as a (meth)acrylic acid ester monomer, 0.8 parts of sodium dodecylbenzenesulfonate, and 100 parts of deionized water. The monomer composition for seed particles was continuously added into the reactor A over 4 hours to carry out a polymerization reaction. Note that a temperature of 80° C. was maintained inside the reactor during continuous addition of the monomer composition for seed particles. Once this continuous addition was completed, the polymerization reaction was continued at 90° C. for 3 hours. As a result, a water dispersion of seed particles was obtained. The volume-average particle diameter of the seed particles measured in the same manner as in the measurement method described above in the "Volume-average particle diameter of non-conductive organic particles and particulate polymer" section was 120 nm.

Next, a reactor including a stirrer was charged with the water dispersion of seed particles described above (16 parts of n-butyl acrylate in terms of solid content), 82 parts of ethylene glycol dimethacrylate (produced by Kyoeisha Chemical Co., Ltd.; product name: LIGHT ESTER EG) as a cross-linkable monomer, 2 parts of acrylic acid as a hydrophilic group-containing monomer, 2.5 parts of sodium dodecylbenzenesulfonate, 4.0 parts of t-butyl peroxy-2-ethylhexanoate (produced by NOF Corporation; product name: PERBUTYL O) as a polymerization initiator, and 200 parts of deionized water. These materials were stirred at 35° C. for 12 hours such that the cross-linkable monomer, the hydrophilic group-containing monomer, and the polymerization initiator were completely absorbed by the seed particles. Thereafter, a temperature of 90° C. was maintained inside the reactor and a polymerization reaction (seeded polymerization) was carried out for 5 hours.

Next, steam was introduced into the reactor so as to remove unreacted monomer and initiator decomposition product, and thereby obtain a water dispersion containing non-conductive organic particles. The glass-transition temperature and the volume-average particle diameter of the obtained non-conductive organic particles were measured. The results are shown in Table 1.

<Production of Water Dispersion Containing Particulate Polymer>

A reactor including a stirrer was supplied with 70 parts of deionized water, 0.15 parts of sodium dodecylbenzenesulfonate as an emulsifier, and 0.5 parts of ammonium persulfate, the gas phase was purged with nitrogen gas, and the temperature was raised to 70° C.

Meanwhile, a monomer composition was obtained in a separate vessel by mixing 50 parts of deionized water, 0.8 parts of sodium dodecylbenzenesulfonate, 94.2 parts of n-butyl acrylate as a (meth)acrylic acid ester monomer, 2 parts of methacrylic acid as a hydrophilic group-containing monomer, 0.3 parts of allyl methacrylate and 1.5 parts of allyl glycidyl ether as cross-linkable monomers, and 2 parts of acrylonitrile as another monomer. The monomer composition was continuously added into the reactor over 4 hours to carry out polymerization. The reaction was carried out at 70° C. during the addition. Once the addition was complete, a further 3 hours of stirring was performed at 80° C. to complete the reaction and thereby yield a water dispersion containing a particulate polymer.

The glass-transition temperature and the volume-average particle diameter of the obtained particulate polymer were measured. The results are shown in Table 1.

<Production of Slurry Composition for Non-Aqueous Secondary Battery Heat-Resistant Layer>

A slurry composition for a heat-resistant layer having a solid content concentration of 15% was produced by mixing 100 parts in terms of solid content of the water dispersion containing non-conductive organic particles that was produced as described above, 6 parts in terms of solid content of the water dispersion containing the particulate polymer that was produced as described above, 4 parts in terms of solid content of the aqueous solution containing the water-soluble polymer that was produced as described above, and 0.8 parts of an ethylene oxide/propylene oxide surfactant (produced by San Nopco Limited; product name: NOPTECHS ED-052) as a wetting agent.

The dispersion stability and the coatability of the slurry composition for a heat-resistant layer obtained in this manner were evaluated. The results are shown in Table 1.

<Production of Separator>

A separator substrate made of polyethylene (produced by Asahi Kasei Corporation; product name: ND407; thickness: 7 μm) was prepared. The slurry composition for a heat-resistant layer produced as described above was applied onto a surface of the prepared separator substrate and was dried at a temperature of 50° C. for 3 minutes. Next, the slurry composition for a heat-resistant layer was applied onto and dried on the uncoated surface in the same manner to obtain a separator including heat-resistant layers at both sides (heat-resistant layer thickness: 1.5 μm per side).

The water content and the heat shrinkage resistance of the heat-resistant layers obtained in this manner were evaluated. The results are shown in Table 1.

<Formation of Negative Electrode>

A 5 MPa pressure-resistant vessel equipped with a stirrer was charged with 33 parts of 1,3-butadiene as an aliphatic conjugated diene monomer, 3.5 parts of itaconic acid as a carboxy group-containing monomer, 63.5 parts of styrene as an aromatic vinyl monomer, 0.4 parts of sodium dodecyl-benzenesulfonate as an emulsifier, 150 parts of deionized water, and 0.5 parts of potassium persulfate as a polymerization initiator. These materials were sufficiently stirred and were then heated to 50° C. to initiate polymerization. The polymerization reaction was quenched by cooling at the point at which the polymerization conversion rate reached 96% to yield a mixture containing a particulate binder (styrene-butadiene copolymer). The mixture was adjusted to pH 8 through addition of 5% sodium hydroxide aqueous solution and was then subjected to thermal-vacuum distillation to remove unreacted monomer. Thereafter, the mixture was cooled to 30° C. or lower to yield a water dispersion containing a binder for a negative electrode.

A planetary mixer was charged with 48.75 parts of artificial graphite (theoretical capacity: 360 mAh/g) and 48.75 parts of natural graphite (theoretical capacity: 360 mAh/g) as negative electrode active materials and 1 part (in terms of solid content) of carboxymethyl cellulose as a thickener. These materials were diluted to a solid content concentration of 60% with deionized water and were subsequently kneaded at a rotation speed of 45 rpm for 60 minutes. Thereafter, 1.5 parts in terms of solid content of the water dispersion containing the binder for a negative electrode obtained as described above was added and was kneaded therewith at a rotation speed of 40 rpm for 40 minutes. The viscosity was then adjusted to 3,000±500 mPas (measured by B-type viscometer at 25° C. and 60 rpm) with deionized water to produce a slurry composition for a negative electrode mixed material layer.

The slurry composition for a negative electrode mixed material layer was applied onto the surface of copper foil of 15 μm in thickness serving as a current collector by a comma coater such as to have a coating weight of 11±0.5 mg/cm². The copper foil having the slurry composition for a negative electrode mixed material layer applied thereon was subsequently conveyed inside an oven having a temperature of 80° C. for 2 minutes and an oven having a temperature of 110° C. for 2 minutes at a speed of 400 mm/min so as to dry the slurry composition on the copper foil and thereby obtain a negative electrode web having a negative electrode mixed material layer formed on the current collector.

Thereafter, the negative electrode mixed material layer-side of the produced negative electrode web was roll pressed with a line pressure of 11 t (tons) in an environment having a temperature of 25±3° C. to obtain a negative electrode having a negative electrode mixed material layer density of 1.60 g/cm³. The negative electrode was subsequently left in an environment having a temperature of 25±3° C. and a relative humidity of 50±5% for 1 week.

<Formation of Positive Electrode>

A slurry composition for a positive electrode mixed material layer was produced by loading 96 parts of an active material NMC111 ($LiNi_{1/3}Co_{1/3}Mn_{1/3}O_2$) based on a lithium complex oxide of Co—Ni—Mn as a positive electrode active material, 2 parts of acetylene black (produced by Denka Company Limited; product name HS-100) as a conductive material, and 2 parts of polyvinylidene fluoride (produced by Kureha Corporation; product name: KF-1100) as a binder for a positive electrode into a planetary mixer, further adding N-methyl-2-pyrrolidone (NMP) as a dispersion medium to adjust the total solid content concentration to 67%, and mixing these materials.

Next, the obtained slurry composition for a positive electrode mixed material layer was applied onto aluminum foil of 20 μm in thickness serving as a current collector by a comma coater such as to have a coating weight of 20±0.5 mg/cm².

The aluminum foil was conveyed inside an oven having a temperature of 90° C. for 2 minutes and an oven having a temperature of 120° C. for 2 minutes at a speed of 200 mm/min so as to dry the slurry composition on the aluminum foil and thereby obtain a positive electrode web having a positive electrode mixed material layer formed on the current collector.

Thereafter, the positive electrode mixed material layer-side of the produced positive electrode web was roll pressed with a line pressure of 14 t (tons) in an environment having a temperature of 25±3° C. to obtain a positive electrode having a positive electrode mixed material layer density of 3.40 g/cm³. The positive electrode was subsequently left in an environment having a temperature of 25±3° C. and a relative humidity of 50±5% for 1 week.

<Production of Lithium Ion Secondary Battery>

The negative electrode, positive electrode, and separator were used to produce a wound cell (discharge capacity equivalent to 520 mAh) and were arranged inside aluminum packing. The inside of the aluminum packing was subsequently filled with $LiPF_6$ solution of 1.0 M in concentration (solvent: mixed solvent of ethylene carbonate (EC)/diethyl carbonate (DEC)=3/7 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery. This lithium ion secondary battery was used to evaluate cycle characteristics. The result is shown in Table 1.

Example 2

An aqueous solution containing a water-soluble polymer, a water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that in production of the aqueous solution containing the water-soluble polymer, the amount of acrylamide as an amide group-containing monomer was changed to 889.0 g (70.0%), the amount of acrylic acid as an acid group-containing monomer was changed to 152.4 g (12.0%), and the amount of N-hydroxyethylacrylamide as a hydroxyl group-containing monomer was changed to 228.6 g (18.0%). Evaluations were conducted in the same manner as in Example 1. The results are shown in Table 1.

Example 3

An aqueous solution containing a water-soluble polymer, a water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that in production of the aqueous solution containing the water-soluble polymer, the amount of acrylamide as an amide group-containing monomer was changed to 825.5 g (65.0%), the amount of acrylic acid as an acid group-containing monomer was changed to 139.7 g (11.0%), and the amount of N-hydroxyethylacrylamide as a hydroxyl group-containing monomer was changed to 304.8 g (24.0%). Evaluations were conducted in the same manner as in Example 1. The results are shown in Table 1.

Example 4

An aqueous solution containing a water-soluble polymer, a water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that in production of the aqueous solution containing the water-soluble polymer, the amount of acrylamide as an amide group-containing monomer was changed to 825.5 g (65.0%), the amount of acrylic acid as an acid group-containing monomer was changed to 38.1 g (3.0%), and the amount of N-hydroxyethylacrylamide as a hydroxyl group-containing monomer was changed to 406.4 g (32.0%). Evaluations were conducted in the same manner as in Example 1. The results are shown in Table 1.

Example 5

An aqueous solution containing a water-soluble polymer, a water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that in production of the aqueous solution containing the water-soluble polymer, the amount of acrylamide as an amide group-containing monomer was changed to 806.45 g (63.5%), the amount of acrylic acid as an acid group-containing monomer was changed to 215.9 g (17.0%), and the amount of N-hydroxyethylacrylamide as a hydroxyl group-containing monomer was changed to 247.65 g (19.5%). Evaluations were conducted in the same manner as in Example 1. The results are shown in Table 1.

Example 6

An aqueous solution containing a water-soluble polymer, a water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that in production of the aqueous solution containing the water-soluble polymer, the amount of acrylamide as an amide group-containing monomer was changed to 1219.2 g (96.0%), the amount of acrylic acid as an acid group-containing monomer was changed to 17.78 g (1.4%), and the amount of N-hydroxyethylacrylamide as a hydroxyl group-containing monomer was changed to 33.02 g (2.6%). Evaluations were conducted in the same manner as in Example 1. The results are shown in Table 1.

Example 7

An aqueous solution containing a water-soluble polymer, a water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that in production of the aqueous solution containing the water-soluble polymer, the amount of acrylamide as an amide group-containing monomer was changed to 939.8 g (74.0%), the amount of acrylic acid as an acid group-containing monomer was changed to 203.2 g (16.0%), and the amount of N-hydroxyethylacrylamide as a hydroxyl group-containing monomer was changed to 127.0 g (10.0%). Evaluations were conducted in the same manner as in Example 1. The results are shown in Table 1.

Example 8

An aqueous solution containing a water-soluble polymer, a water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that in production of the aqueous solution containing the water-soluble polymer, the amount of acrylamide as an amide group-containing monomer was changed to 939.8 g (74.0%), the amount of acrylic acid as an acid group-containing monomer was changed to 63.5 g (5.0%), and the amount of N-hydroxyethylacrylamide as a hydroxyl group-containing monomer was changed to 266.7 g (21.0%). Evaluations were conducted in the same manner as in Example 1. The results are shown in Table 1.

Example 9

An aqueous solution containing a water-soluble polymer, a water dispersion containing a particulate polymer, a slurry composition for a heat-resistant layer, a negative electrode, a positive electrode, a separator, and a lithium ion secondary battery were prepared or produced in the same way as in Example 1 with the exception that a water dispersion containing non-conductive organic particles that was produced as described below was used. Evaluations were conducted in the same manner as in Example 1. The results are shown in Table 1.

<Production of Water Dispersion Containing Non-Conductive Organic Particles>

A reactor A including a stirrer was charged with 0.1 parts of sodium dodecylbenzenesulfonate, 0.3 parts of ammonium persulfate, and 100 parts of deionized water. These materials were mixed to obtain a mixture and were heated to 80° C. Meanwhile, a monomer composition for seed particles was produced in a separate vessel by mixing 100 parts of n-butyl acrylate as a (meth)acrylic acid ester monomer, 0.6 parts of sodium dodecylbenzenesulfonate, and 100 parts of deionized water. The monomer composition for seed particles was continuously added into the reactor A over 4 hours to carry out a polymerization reaction. Note that a temperature of 80° C. was maintained inside the reactor during continuous addition of the monomer composition for seed particles. Once this continuous addition was completed, the polymerization reaction was continued at 90° C. for 3 hours. As a result, a water dispersion of seed particles was obtained. The volume-average particle diameter of the seed particles measured in the same manner as in the measurement method described above in the "Volume-average particle diameter of non-conductive organic particles and particulate polymer" section was 160 nm.

Next, a reactor including a stirrer was charged with the water dispersion of seed particles described above (48 parts of n-butyl acrylate in terms of solid content), 50 parts of ethylene glycol dimethacrylate (produced by Kyoeisha Chemical Co., Ltd.; product name: LIGHT ESTER EG) as a cross-linkable monomer, 2 parts of acrylic acid as a hydrophilic group-containing monomer, 2.5 parts of sodium dodecylbenzenesulfonate, 4.0 parts of t-butyl peroxy-2-ethylhexanoate (produced by NOF Corporation; product name: PERBUTYL O) as a polymerization initiator, and 200 parts of deionized water. These materials were stirred at 35° C. for 12 hours such that the cross-linkable monomer, the hydrophilic group-containing monomer, and the polymerization initiator were completely absorbed by the seed particles. Thereafter, a temperature of 90° C. was maintained inside the reactor and a polymerization reaction (seeded polymerization) was carried out for 5 hours.

Next, steam was introduced into the reactor so as to remove unreacted monomer and initiator decomposition product, and thereby obtain a water dispersion containing non-conductive organic particles.

Example 10

An aqueous solution containing a water-soluble polymer, a water dispersion containing a particulate polymer, a slurry composition for a heat-resistant layer, a negative electrode, a positive electrode, a separator, and a lithium ion secondary battery were prepared or produced in the same way as in Example 1 with the exception that a water dispersion containing non-conductive organic particles that was produced as described below was used. Evaluations were conducted in the same manner as in Example 1. The results are shown in Table 1.

<Production of Water Dispersion Containing Non-Conductive Organic Particles>

A reactor A including a stirrer was charged with 0.1 parts of sodium dodecylbenzenesulfonate, 0.3 parts of ammonium persulfate, and 100 parts of deionized water. These materials were mixed to obtain a mixture and were heated to 80° C. Meanwhile, a monomer composition for seed particles was produced in a separate vessel by mixing 100 parts of n-butyl acrylate as a (meth)acrylic acid ester monomer, 0.4 parts of sodium dodecylbenzenesulfonate, and 100 parts of deionized water. The monomer composition for seed particles was continuously added into the reactor A over 4 hours to carry out a polymerization reaction. Note that a temperature of 80° C. was maintained inside the reactor during continuous addition of the monomer composition for seed particles. Once this continuous addition was completed, the polymerization reaction was continued at 90° C. for 3 hours. As a result, a water dispersion of seed particles was obtained. The volume-average particle diameter of the seed particles measured in the same manner as in the measurement method described above in the "Volume-average particle diameter of non-conductive organic particles and particulate polymer" section was 200 nm.

Next, a reactor including a stirrer was charged with the water dispersion of seed particles described above (73 parts of n-butyl acrylate in terms of solid content), 25 parts of ethylene glycol dimethacrylate (produced by Kyoeisha Chemical Co., Ltd.; product name: LIGHT ESTER EG) as a cross-linkable monomer, 2 parts of acrylic acid as a hydrophilic group-containing monomer, 2.5 parts of sodium dodecylbenzenesulfonate, 4.0 parts of t-butyl peroxy-2-ethylhexanoate (produced by NOF Corporation; product name: PERBUTYL O) as a polymerization initiator, and 200 parts of deionized water. These materials were stirred at 35° C. for 12 hours such that the cross-linkable monomer, the hydrophilic group-containing monomer, and the polymerization initiator were completely absorbed by the seed particles. Thereafter, a temperature of 90° C. was maintained inside the reactor and a polymerization reaction (seeded polymerization) was carried out for 5 hours.

Next, steam was introduced into the reactor so as to remove unreacted monomer and initiator decomposition product, and thereby obtain a water dispersion containing non-conductive organic particles.

Example 11

An aqueous solution containing a water-soluble polymer, a water dispersion containing a particulate polymer, a slurry composition for a heat-resistant layer, a negative electrode, a positive electrode, a separator, and a lithium ion secondary battery were prepared or produced in the same way as in Example 1 with the exception that a water dispersion containing non-conductive organic particles that was produced as described below was used. Evaluations were conducted in the same manner as in Example 1. The results are shown in Table 2.

<Production of Water Dispersion Containing Non-Conductive Organic Particles>

A reactor A including a stirrer was charged with 0.3 parts of sodium dodecylbenzenesulfonate, 0.5 parts of ammonium persulfate, and 100 parts of deionized water. These materials were mixed to obtain a mixture and were heated to 80° C. Meanwhile, a monomer composition for seed particles was produced in a separate vessel by mixing 100 parts of n-butyl acrylate as a (meth)acrylic acid ester monomer, 1.2 parts of sodium dodecylbenzenesulfonate, and 100 parts of deionized water. The monomer composition for seed particles was continuously added into the reactor A over 4 hours to carry out a polymerization reaction. Note that a temperature of 80° C. was maintained inside the reactor during continuous addition of the monomer composition for seed particles. Once this continuous addition was completed, the polymerization reaction was continued at 90° C. for 3 hours. As a result, a water dispersion of seed particles was obtained. The volume-average particle diameter of the seed particles measured in the same manner as in the measurement method described above in the "Volume-average particle diameter of non-conductive organic particles and particulate polymer" section was 60 nm.

Next, a reactor including a stirrer was charged with the water dispersion of seed particles described above (5 parts of n-butyl acrylate in terms of solid content), 93 parts of ethylene glycol dimethacrylate (produced by Kyoeisha Chemical Co., Ltd.; product name: LIGHT ESTER EG) as a cross-linkable monomer, 2 parts of acrylic acid as a hydrophilic group-containing monomer, 2.5 parts of sodium dodecylbenzenesulfonate, 4.0 parts of t-butyl peroxy-2-ethylhexanoate (produced by NOF Corporation; product name: PERBUTYL O) as a polymerization initiator, and 200 parts of deionized water. These materials were stirred at 35° C. for 12 hours such that the cross-linkable monomer, the hydrophilic group-containing monomer, and the polymerization initiator were completely absorbed by the seed particles. Thereafter, a temperature of 90° C. was maintained inside the reactor and a polymerization reaction (seeded polymerization) was carried out for 5 hours.

Next, steam was introduced into the reactor so as to remove unreacted monomer and initiator decomposition product, and thereby obtain a water dispersion containing non-conductive organic particles.

Example 12

An aqueous solution containing a water-soluble polymer, a water dispersion containing a particulate polymer, a slurry composition for a heat-resistant layer, a negative electrode, a positive electrode, a separator, and a lithium ion secondary battery were prepared or produced in the same way as in Example 1 with the exception that a water dispersion containing non-conductive organic particles that was produced as described below was used.

Evaluations were conducted in the same manner as in Example 1. The results are shown in Table 2.

<Production of Water Dispersion Containing Non-Conductive Organic Particles>

A reactor A including a stirrer was charged with 0.5 parts of sodium dodecylbenzenesulfonate, 0.5 parts of ammonium persulfate, and 100 parts of deionized water. These materials were mixed to obtain a mixture and were heated to 80° C. Meanwhile, a monomer composition for seed particles was produced in a separate vessel by mixing 100 parts of n-butyl acrylate as a (meth)acrylic acid ester monomer, 1.2 parts of sodium dodecylbenzenesulfonate, and 100 parts of deionized water. The monomer composition for seed particles was continuously added into the reactor A over 4 hours to carry out a polymerization reaction. Note that a temperature of 80° C. was maintained inside the reactor during continuous addition of the monomer composition for seed particles. Once this continuous addition was completed, the polymerization reaction was continued at 90° C. for 3 hours. As a result, a water dispersion of seed particles was obtained. The volume-average particle diameter of the seed particles measured in the same manner as in the measurement method described above in the "Volume-average particle diameter of non-conductive organic particles and particulate polymer" section was 50 nm.

Next, a reactor including a stirrer was charged with the water dispersion of seed particles described above (16 parts of n-butyl acrylate in terms of solid content), 82 parts of ethylene glycol dimethacrylate (produced by Kyoeisha Chemical Co., Ltd.; product name: LIGHT ESTER EG) as a cross-linkable monomer, 2 parts of acrylic acid as a hydrophilic group-containing monomer, 2.5 parts of sodium dodecylbenzenesulfonate, 4.0 parts of t-butyl peroxy-2-ethylhexanoate (produced by NOF Corporation; product name: PERBUTYL O) as a polymerization initiator, and 200 parts of deionized water. These materials were stirred at 35° C. for 12 hours such that the cross-linkable monomer, the hydrophilic group-containing monomer, and the polymerization initiator were completely absorbed by the seed particles. Thereafter, a temperature of 90° C. was maintained inside the reactor and a polymerization reaction (seeded polymerization) was carried out for 5 hours.

Next, steam was introduced into the reactor so as to remove unreacted monomer and initiator decomposition product, and thereby obtain a water dispersion containing non-conductive organic particles.

Example 13

An aqueous solution containing a water-soluble polymer, a water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that 2-hydroxyethyl methacrylate was used instead of N-hydroxyethylacrylamide as a hydroxyl group-containing monomer in production of the aqueous solution containing the water-soluble polymer. Evaluations were conducted in the same manner as in Example 1. The results are shown in Table 2.

Comparative Example 1

A water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that an aqueous solution containing a water-soluble polymer that was produced as described below was used. Evaluations were conducted in the same manner as in Example 1. The results are shown in Table 2.

<Production of Aqueous Solution Containing Water-Soluble Polymer>

A 10 L septum-equipped flask was charged with a monomer composition containing 895.0 g (89.5%) of acrylamide and 15.0 g (1.5%) of dimethylacrylamide as amide group-containing monomers and 90.0 g (9.0%) of acrylic acid as an acid group-containing monomer, and also with 3,650 g of deionized water and 50 g of isopropyl alcohol, and the inside of the flask was purged with nitrogen gas at a flow rate of 100 mL/min. Next, 70 g of 5% ammonium persulfate aqueous solution and 30 g of 5% sodium bisulfite aqueous solution as polymerization initiators were added into the flask under stirring, and then the temperature was raised from room temperature to 80° C. and was held thereat for 3 hours. Thereafter, 1,620 g of deionized water was added, and the pH was adjusted to 8 with 10% sodium hydroxide aqueous solution to yield an aqueous solution containing a water-soluble polymer.

Comparative Example 2

An aqueous solution containing a water-soluble polymer, a water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that in production of the aqueous solution containing the water-soluble polymer, acrylic acid as an acid group-containing monomer and N-hydroxyethylacrylamide as a hydroxyl group-containing monomer were not added, and the amount of acrylamide as an amide group-containing monomer was changed to 1,270 g (100%). Evaluations were conducted in the same manner as in Example 1. The results are shown in Table 2.

Comparative Example 3

A water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that an aqueous solution containing a water-soluble polymer that was produced as described below was used. Evaluations were conducted in the same manner as in Example 1. The results are shown in Table 2.
<Production of Aqueous Solution Containing Water-Soluble Polymer>
A 10 L septum-equipped flask was charged with 6,335 g of deionized water and 95 g of a 2.0% aqueous solution of L-ascorbic acid as a polymerization accelerator. These materials were heated to a temperature of 40° C., and the inside of the flask was purged with nitrogen gas at a flow rate of 100 mL/min. Next, 635.0 g (50.0%) of acrylamide and 127.0 g (10.0%) of methacrylamide as amide group-containing monomers, 317.5 g (25.0%) of acrylic acid and 63.5 g (5.0%) of 2-acrylamido-2-methylpropane sulfonic acid as acid group-containing monomers, 63.5 g (5.0%) of 2-hydroxyethyl methacrylate as a hydroxyl group-containing monomer, and 63.5 g (5.0%) of methacrylonitrile as another monomer were mixed and were injected into the flask by a syringe. Thereafter, 100 g of a 5.0% aqueous solution of ammonium persulfate as a polymerization initiator was added into the flask by a syringe, and the reaction temperature was set to 60° C. Once 2 hours had passed, 50 g of a 5.0% aqueous solution of ammonium persulfate as a polymerization initiator and 47.5 g of a 2.0% aqueous solution of L-ascorbic acid as a polymerization accelerator were added in order to further raise the reaction conversion rate. Once a further 2 hours had passed, 50 g of a 5.0% aqueous solution of ammonium persulfate as a polymerization initiator and 47.5 g of a 2.0% aqueous solution of L-ascorbic acid as a polymerization accelerator were added. Two hours later, 34 g of a 5% aqueous solution of sodium nitrite as a reaction inhibitor was added into the flask and was stirred. Thereafter, the flask was cooled to 40° C. and was converted to an air atmosphere. The pH of the system was adjusted to 8.0 using 8% lithium hydroxide aqueous solution to thereby yield an aqueous solution containing a water-soluble polymer.

Comparative Example 4

A water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that an aqueous solution containing a water-soluble polymer that was produced as described below was used. Evaluations were conducted in the same manner as in Example 1. The results are shown in Table 2.
<Production of Aqueous Solution Containing Water-Soluble Polymer>
A 10 L septum-equipped flask was charged with 6,335 g of deionized water and 95 g of a 2.0% aqueous solution of L-ascorbic acid as a polymerization accelerator. These materials were heated to a temperature of 40° C., and the inside of the flask was purged with nitrogen gas at a flow rate of 100 mL/min. Next, 571.5 g (45.0%) of acrylamide as an amide group-containing monomer, 317.5 g (25.0%) of acrylic acid as an acid group-containing monomer, and 381.0 g (30.0%) of N-hydroxyethylacrylamide as a hydroxyl group-containing monomer were mixed and were injected into the flask by a syringe. Thereafter, 100 g of a 5.0% aqueous solution of ammonium persulfate as a polymerization initiator was added into the flask by a syringe, and the reaction temperature was set to 60° C. Once 2 hours had passed, 50 g of a 5.0% aqueous solution of ammonium persulfate as a polymerization initiator and 47.5 g of a 2.0% aqueous solution of L-ascorbic acid as a polymerization accelerator were added in order to further raise the reaction conversion rate. Once a further 2 hours had passed, 50 g of a 5.0% aqueous solution of ammonium persulfate as a polymerization initiator and 47.5 g of a 2.0% aqueous solution of L-ascorbic acid as a polymerization accelerator were added. Two hours later, 34 g of a 5% aqueous solution of sodium nitrite as a reaction inhibitor was added into the flask and was stirred. Thereafter, the flask was cooled to 40° C. and was converted to an air atmosphere. The pH of the system was adjusted to 8.0 using 8% lithium hydroxide aqueous solution to thereby yield an aqueous solution containing a water-soluble polymer.

Comparative Example 5

An aqueous solution containing a water-soluble polymer, a water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that in production of the aqueous solution containing the water-soluble polymer, the amount of acrylamide as an amide group-containing monomer was changed to 946.15 g (74.5%), the amount of acrylic acid as an acid group-containing monomer was changed to 6.35 g (0.5%), and the amount of N-hydroxyethylacrylamide as a hydroxyl group-containing monomer was changed to 317.5 g (25.0%). Evaluations were conducted in the same manner as in Example 1. The results are shown in Table 2.

Comparative Example 6

In production of a slurry composition for a heat-resistant layer, 100 parts (in terms of solid content) of a water dispersion containing non-conductive inorganic particles that was produced as described below was used instead of 100 parts (in terms of solid content) of a water dispersion containing non-conductive organic particles, and the additive amount of an aqueous solution containing a water-soluble polymer was changed from 4 parts to 2 parts. With the exception of the above, an aqueous solution containing a water-soluble polymer, a water dispersion containing a particulate polymer, a slurry composition for a heat-resistant layer, a negative electrode, a positive electrode, a separator, and a lithium ion secondary battery were prepared or produced in the same way as in Example 1. Evaluations were conducted in the same manner as in Example 1. The results are shown in Table 2.

<Production of Water Dispersion Containing Non-Conductive Inorganic Particles>

Alumina particles (produced by Sumitomo Chemical Co., Ltd.; product name: AKP-30; volume-average particle diameter: 0.3 μm) were prepared as non-conductive inorganic particles, and sodium polyacrylate (produced by Toagosei Co., Ltd.; product name: ARON T-50) was prepared as a dispersant. A water dispersion containing non-conductive inorganic particles was obtained by mixing 100 parts of the non-conductive inorganic particles, 0.5 parts of the dispersant, and deionized water, and then treating the mixture for 1 hour using a bead mill (produced by Ashizawa Finetech Ltd.; product name: LMZ015).

Comparative Example 7

An aqueous solution containing a water-soluble polymer, a water dispersion containing a particulate polymer, a slurry composition for a heat-resistant layer, a negative electrode, a positive electrode, a separator, and a lithium ion secondary battery were prepared or produced in the same way as in Example 1 with the exception that a water dispersion containing non-conductive organic particles that was produced as described below was used. Evaluations were conducted in the same manner as in Example 1. The results are shown in Table 2.

<Production of Water Dispersion Containing Non-Conductive Organic Particles>

A reactor A including a stirrer was charged with 0.1 parts of sodium dodecylbenzenesulfonate, 0.3 parts of ammonium persulfate, and 100 parts of deionized water. These materials were mixed to obtain a mixture and were heated to 75° C. Meanwhile, a monomer composition for non-conductive organic particles was produced in a separate vessel by mixing 93 parts of methyl methacrylate as a (meth)acrylic acid ester monomer, 5 parts of ethylene glycol dimethacrylate (produced by Kyoeisha Chemical Co., Ltd.; product name: LIGHT ESTER EG) as a cross-linkable monomer, 2 parts of acrylic acid as a hydrophilic group-containing monomer, 0.4 parts of sodium dodecylbenzenesulfonate, and 100 parts of deionized water. The monomer composition for non-conductive organic particles was continuously added into the reactor A over 4 hours to carry out a polymerization reaction. Note that a temperature of 75° C. was maintained inside the reactor during continuous addition of the monomer composition for non-conductive organic particles. Once this continuous addition was completed, the polymerization reaction was continued at 80° C. for 3 hours to obtain a water dispersion containing non-conductive organic particles.

Comparative Example 8

A water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that 4 parts (in terms of solid content) of carboxymethyl cellulose having a degree of etherification of 0.8 to 1.0 (produced by Daicel FineChem Ltd.; product name: D1220) was used instead of 4 parts (in terms of solid content) of an aqueous solution containing a water-soluble polymer in production of the slurry composition for a heat-resistant layer. Evaluations were conducted in the same manner as in Example 1. The results are shown in Table 2.

Comparative Example 9

A water dispersion containing non-conductive organic particles, a water dispersion containing a particulate polymer, a slurry composition for a heat-resistant layer, a negative electrode, a positive electrode, a separator, and a lithium ion secondary battery were prepared or produced in the same way as in Example 1 with the exception that 4 parts (in terms of solid content) of polyvinyl alcohol (produced by Kuraray Co., Ltd.; product name: PVA 110) was used instead of 4 parts (in terms of solid content) of an aqueous solution containing a water-soluble polymer in production of the slurry composition for a heat-resistant layer. Evaluations were conducted in the same manner as in Example 1. The results are shown in Table 2.

In Tables 1 and 2, shown below:
"AAm" indicates acrylamide unit;
"DMAAm" indicates dimethylacrylamide unit;
"MAAm" indicates methacrylamide unit;
"AA" indicates acrylic acid unit;
"ATBS" indicates 2-acrylamido-2-methylpropane sulfonic acid unit;
"HEAAm" indicates N-hydroxyethylacrylamide unit;
"HEMA" indicates 2-hydroxyethyl methacrylate unit;
"MAN" indicates methacrylonitrile unit;
"EDMA" indicates ethylene glycol dimethacrylate;
"BA" indicates n-butyl acrylate unit;
"MMA" indicates methyl methacrylate;
"AGE" indicates allyl glycidyl ether unit;
"AMA" indicates allyl methacrylate unit;
"MAA" indicates methacrylic acid unit;
"AN" indicates acrylonitrile unit;
"$Al_2O_3$" indicates alumina particles;
"CMC" indicates carboxymethyl cellulose;
"PVA" indicates polyvinyl alcohol; and
">200" indicates higher than 200° C.

TABLE 1

|  |  |  |  | Example 1 | Example 2 | Example 3 | Example 4 | Example 5 |
|---|---|---|---|---|---|---|---|---|
| Slurry composition for heat-resistant layer | Water-soluble polymer | Amide group-containing monomer unit [mass %] | AAm | 74 | 70 | 65 | 65 | 63.5 |
|  |  |  | DMAAm | — | — | — | — | — |
|  |  |  | MAAm | — | — | — | — | — |
|  |  | Acid group-containing monomer unit [mass %] | AA | 10 | 12 | 11 | 3 | 17 |
|  |  |  | ATBS | — | — | — | — | — |
|  |  | Hydroxyl | HEAAm | 16 | 18 | 24 | 32 | 19.5 |

TABLE 1-continued

| | | | | Example 1 | Example 2 | Example 3 | Example 4 | Example 5 |
|---|---|---|---|---|---|---|---|---|
| | | group-containing monomer unit [mass %] | HEMA | — | — | — | — | — |
| | | Other repeating unit [mass %] | MAN | — | — | — | — | — |
| | | Hydroxyl group/acid group molar ratio | | 1.00 | 0.94 | 1.37 | 6.68 | 0.72 |
| | | Weight-average molecular weight | | $500 \times 10^3$ | $500 \times 10^3$ | $500 \times 10^3$ | $500 \times 10^3$ | $500 \times 10^3$ |
| | | Content [parts by mass] | | 4 | 4 | 4 | 4 | 4 |
| | Non-conductive organic particles | Cross-linkable monomer unit [mass %] | EDMA | 82 | 82 | 82 | 82 | 82 |
| | | (Meth)acrylic acid ester monomer unit [mass %] | BA | 16 | 16 | 16 | 16 | 16 |
| | | | MMA | — | — | — | — | — |
| | | Hydrophilic group-containing monomer unit [mass %] | AA | 2 | 2 | 2 | 2 | 2 |
| | | Volume-average particle diameter [μm] | | 0.23 | 0.23 | 0.23 | 0.23 | 0.23 |
| | | Glass-transition temperature [° C.] | | >200 | >200 | >200 | >200 | >200 |
| | | Content [parts by mass] | | 100 | 100 | 100 | 100 | 100 |
| | Particulate polymer | Cross-linkable monomer unit [mass %] | AGE | 1.5 | 1.5 | 1.5 | 1.5 | 1.5 |
| | | | AMA | 0.3 | 0.3 | 0.3 | 0.3 | 0.3 |
| | | (Meth)acrylic acid ester monomer unit [mass %] | BA | 94.2 | 94.2 | 94.2 | 94.2 | 94.2 |
| | | Hydrophilic group-containing monomer unit [mass %] | MAA | 2 | 2 | 2 | 2 | 2 |
| | | Other monomer unit [mass %] | AN | 2 | 2 | 2 | 2 | 2 |
| | | Volume-average particle diameter [μm] | | 0.13 | 0.13 | 0.13 | 0.13 | 0.13 |
| | | Glass-transition temperature [° C.] | | −40 | −40 | −40 | −40 | −40 |
| | | Content [parts by mass] | | 6 | 6 | 6 | 6 | 6 |
| | Other | Non-conductive inorganic particles ($Al_2O_3$) Content [parts by mass] | | — | — | — | — | — |
| | | CMC Content [parts by mass] | | — | — | — | — | — |
| | | PVA Content [parts by mass] | | — | — | — | — | — |
| Evaluation | | Water content | | A | A | A | A | A |
| | | Heat shrinkage resistance | | A | B | B | B | B |
| | | Dispersion stability | | A | A | A | A | B |
| | | Coatability | | A | A | A | B | A |
| | | Cycle characteristics | | A | A | A | A | A |

| | | | | Example 6 | Example 7 | Example 8 | Example 9 | Example 10 |
|---|---|---|---|---|---|---|---|---|
| Slurry composition for heat-resistant layer | Water-soluble polymer | Amide group-containing monomer unit [mass %] | AAm | 96 | 74 | 74 | 74 | 74 |
| | | | DMAAm | — | — | — | — | — |
| | | | MAAm | — | — | — | — | — |
| | | Acid group-containing monomer unit [mass %] | AA | 1.4 | 16 | 5 | 10 | 10 |
| | | | ATBS | — | — | — | — | — |
| | | Hydroxyl group-containing monomer unit [mass %] | HEAAm | 2.6 | 10 | 21 | 16 | 16 |
| | | | HEMA | — | — | — | — | — |
| | | Other repeating unit [mass %] | MAN | — | — | — | — | — |
| | | Hydroxyl group/acid group molar ratio | | 1.16 | 0.39 | 2.63 | 1.00 | 1.00 |
| | | Weight-average molecular weight | | $500 \times 10^3$ | $500 \times 10^3$ | $500 \times 10^3$ | $500 \times 10^3$ | $500 \times 10^3$ |
| | | Content [parts by mass] | | 4 | 4 | 4 | 4 | 4 |
| | Non-conductive organic particles | Cross-linkable monomer unit [mass %] | EDMA | 82 | 82 | 82 | 50 | 25 |
| | | (Meth)acrylic acid ester monomer unit [mass %] | BA | 16 | 16 | 16 | 48 | 73 |
| | | | MMA | — | — | — | — | — |
| | | Hydrophilic group-containing monomer unit [mass %] | AA | 2 | 2 | 2 | 2 | 2 |
| | | Volume-average particle diameter [μm] | | 0.23 | 0.23 | 0.23 | 0.23 | 0.23 |
| | | Glass-transition temperature [° C.] | | >200 | >200 | >200 | >200 | >200 |
| | | Content [parts by mass] | | 100 | 100 | 100 | 100 | 100 |
| | Particulate polymer | Cross-linkable monomer unit [mass %] | AGE | 1.5 | 1.5 | 1.5 | 1.5 | 1.5 |
| | | | AMA | 0.3 | 0.3 | 0.3 | 0.3 | 0.3 |
| | | (Meth)acrylic acid ester monomer unit [mass %] | BA | 94.2 | 94.2 | 94.2 | 94.2 | 94.2 |
| | | Hydrophilic group-containing monomer unit [mass %] | MAA | 2 | 2 | 2 | 2 | 2 |
| | | Other monomer unit [mass %] | AN | 2 | 2 | 2 | 2 | 2 |
| | | Volume-average particle diameter [μm] | | 0.13 | 0.13 | 0.13 | 0.13 | 0.13 |
| | | Glass-transition temperature [° C.] | | −40 | −40 | −40 | −40 | −40 |
| | | Content [parts by mass] | | 6 | 6 | 6 | 6 | 6 |

TABLE 1-continued

|  |  |  |  |  |  |  |  |  |
|---|---|---|---|---|---|---|---|---|
|  | Other | Non-conductive inorganic particles (Al$_2$O$_3$) | Content [parts by mass] | — | — | — | — | — |
|  |  | CMC | Content [parts by mass] | — | — | — | — | — |
|  |  | PVA | Content [parts by mass] | — | — | — | — | — |
| Evaluation |  | Water content |  | B | A | A | A | A |
|  |  | Heat shrinkage resistance |  | A | A | A | B | B |
|  |  | Dispersion stability |  | B | B | A | A | B |
|  |  | Coatability |  | B | B | B | A | B |
|  |  | Cycle characteristics |  | B | B | A | A | B |

TABLE 2

|  |  |  |  | Example 11 | Example 12 | Example 13 | Comparative Example 1 | Comparative Example 2 | Comparative Example 3 |
|---|---|---|---|---|---|---|---|---|---|
| Slurry composition for heat-resistant layer | Water-soluble polymer | Amide group-containing monomer unit [mass %] | AAm | 74 | 74 | 74 | 89.5 | 100 | 50 |
|  |  |  | DMAAm | — | — | — | 1.5 | — | — |
|  |  |  | MAAm | — | — | — | — | — | 10 |
|  |  | Acid group-containing monomer unit [mass %] | AA | 10 | 10 | 10 | 9 | — | 25 |
|  |  |  | ATBS | — | — | — | — | — | 5 |
|  |  | Hydroxyl group-containing monomer unit [mass %] | HEAAm | 16 | 16 | — | — | — | — |
|  |  |  | HEMA | — | — | 16 | — | — | 5 |
|  |  | Other repeating unit [mass %] | MAN | — | — | — | — | — | 5 |
|  |  | Hydroxyl group/acid group molar ratio |  | 1.00 | 1.00 | 0.89 | — | — | 0.10 |
|  |  | Weight-average molecular weight |  | 500 × 10$^3$ | 500 × 10$^3$ | 500 × 10$^3$ | 360 × 10$^3$ | 500 × 10$^3$ | 1000 × 10$^3$ |
|  |  | Content [parts by mass] |  | 4 | 4 | 4 | 4 | 4 | 4 |
|  | Non-conductive organic particles | Cross-linkable monomer unit [mass %] | EDMA | 93 | 82 | 82 | 82 | 82 | 82 |
|  |  | (Meth)acrylic acid ester monomer unit [mass %] | BA | 5 | 16 | 16 | 16 | 16 | 16 |
|  |  |  | MMA | — | — | — | — | — | — |
|  |  | Hydrophilic group-containing monomer unit [mass %] | AA | 2 | 2 | 2 | 2 | 2 | 2 |
|  |  | Volume-average particle diameter [μm] |  | 0.23 | 0.08 | 0.23 | 0.23 | 0.23 | 0.23 |
|  |  | Glass-transition temperature [° C.] |  | >200 | >200 | >200 | >200 | >200 | >200 |
|  |  | Content [parts by mass] |  | 100 | 100 | 100 | 100 | 100 | 100 |
|  | Particulate polymer | Cross-linkable monomer unit [mass %] | AGE | 1.5 | 1.5 | 1.5 | 1.5 | 1.5 | 1.5 |
|  |  |  | AMA | 0.3 | 0.3 | 0.3 | 0.3 | 0.3 | 0.3 |
|  |  | (Meth)acrylic acid ester monomer unit [mass %] | BA | 94.2 | 94.2 | 94.2 | 94.2 | 94.2 | 94.2 |
|  |  | Hydrophilic group-containing monomer unit [mass %] | MAA | 2 | 2 | 2 | 2 | 2 | 2 |
|  |  | Other monomer unit [mass %] | AN | 2 | 2 | 2 | 2 | 2 | 2 |
|  |  | Volume-average particle diameter [μm] |  | 0.13 | 0.13 | 0.13 | 0.13 | 0.13 | 0.13 |
|  |  | Glass-transition temperature [° C.] |  | −40 | −40 | −40 | −40 | −40 | −40 |
|  |  | Content [parts by mass] |  | 6 | 6 | 6 | 6 | 6 | 6 |
|  | Other | Non-conductive inorganic particles (Al$_2$O$_3$) | Content [parts by mass] | — | — | — | — | — | — |
|  |  | CMC | Content [parts by mass] | — | — | — | — | — | — |
|  |  | PVA | Content [parts by mass] | — | — | — | — | — | — |
| Evaluation |  | Water content |  | A | B | B | A | A | B |
|  |  | Heat shrinkage resistance |  | A | A | B | B | B | C |
|  |  | Dispersion stability |  | B | A | A | C | C | C |
|  |  | Coatability |  | A | A | A | C | C | C |
|  |  | Cycle characteristics |  | A | B | B | A | B | A |

TABLE 2-continued

|  |  |  |  | Comparative Example 4 | Comparative Example 5 | Comparative Example 6 | Comparative Example 7 | Comparative Example 8 | Comparative Example 9 |
|---|---|---|---|---|---|---|---|---|---|
| Slurry composition for heat-resistant layer | Water-soluble polymer | Amide group-containing monomer unit [mass %] | AAm | 45 | 74.5 | 74 | 74 | — | — |
|  |  |  | DMAAm | — | — | — | — | — | — |
|  |  |  | MAAm | — | — | — | — | — | — |
|  |  | Acid group-containing monomer unit [mass %] | AA | 25 | 0.5 | 10 | 10 | — | — |
|  |  |  | ATBS | — | — | — | — | — | — |
|  |  | Hydroxyl group-containing monomer unit [mass %] | HEAAm | 30 | 25 | 16 | 16 | — | — |
|  |  |  | HEMA | — | — | — | — | — | — |
|  |  | Other repeating unit [mass %] | MAN | — | — | — | — | — | — |
|  |  | Hydroxyl group/acid group molar ratio |  | 0.75 | 31.29 | 1.00 | 1.00 | — | — |
|  |  | Weight-average molecular weight |  | $1000 \times 10^3$ | $500 \times 10^3$ | $500 \times 10^3$ | $500 \times 10^3$ | — | — |
|  |  | Content [parts by mass] |  | 4 | 4 | 2 | 4 | — | — |
|  | Non-conductive organic particles | Cross-linkable monomer unit [mass %] | EDMA | 82 | 82 | — | 5 | 82 | 82 |
|  |  | (Meth)acrylic acid ester monomer unit [mass %] | BA | 16 | 16 | — | — | 16 | 16 |
|  |  |  | MMA | — | — | — | 93 | — | — |
|  |  | Hydrophilic group-containing monomer unit [mass %] | AA | 2 | 2 | — | 2 | 2 | 2 |
|  |  | Volume-average particle diameter [μm] |  | 0.23 | 0.23 | — | 0.23 | 0.23 | 0.23 |
|  |  | Glass-transition temperature [° C.] |  | >200 | >200 | — | 105 | >200 | >200 |
|  |  | Content [parts by mass] |  | 100 | 100 | — | 100 | 100 | 100 |
|  | Particulate polymer | Cross-linkable monomer unit [mass %] | AGE | 1.5 | 1.5 | 1.5 | 1.5 | 1.5 | 1.5 |
|  |  |  | AMA | 0.3 | 0.3 | 0.3 | 0.3 | 0.3 | 0.3 |
|  |  | (Meth)acrylic acid ester monomer unit [mass %] | BA | 94.2 | 94.2 | 94.2 | 94.2 | 94.2 | 94.2 |
|  |  | Hydrophilic group-containing monomer unit [mass %] | MAA | 2 | 2 | 2 | 2 | 2 | 2 |
|  |  | Other monomer unit [mass %] | AN | 2 | 2 | 2 | 2 | 2 | 2 |
|  |  | Volume-average particle diameter [μm] |  | 0.13 | 0.13 | 0.13 | 0.13 | 0.13 | 0.13 |
|  |  | Glass-transition temperature [° C.] |  | −40 | −40 | −40 | −40 | −40 | −40 |
|  |  | Content [parts by mass] |  | 6 | 6 | 6 | 6 | 6 | 6 |
|  | Other | Non-conductive inorganic particles (Al$_2$O$_3$) | Content [parts by mass] | — | — | 100 | — | — | — |
|  |  | CMC | Content [parts by mass] | — | — | — | — | 4 | — |
|  |  | PVA | Content [parts by mass] | — | — | — | — | — | 4 |
| Evaluation |  | Water content |  | B | A | C | A | C | C |
|  |  | Heat shrinkage resistance |  | C | B | A | C | B | B |
|  |  | Dispersion stability |  | C | A | B | B | B | B |
|  |  | Coatability |  | B | C | A | A | A | A |
|  |  | Cycle characteristics |  | A | B | C | C | C | C |

It can be seen from Tables 1 and 2 that it was possible to form a slurry composition for a heat-resistant layer having excellent dispersion stability and coatability and a heat-resistant layer having both excellent heat shrinkage resistance and low residual water content in Examples 1 to 13 in which the used slurry composition for a heat-resistant layer contained: a water-soluble polymer that included an amide group-containing monomer unit, an acid group-containing monomer unit, and a hydroxyl group-containing monomer unit and in which the proportional contents of the amide group-containing monomer unit and the acid group-containing monomer unit were within specific ranges; and non-conductive organic particles in which the proportional content of a cross-linkable monomer unit was within a specific range. It can also be seen that the heat-resistant layers of Examples 1 to 13 could cause a secondary battery to display excellent cycle characteristics.

On the other hand, it can be seen that dispersion stability and coatability of a slurry composition for a heat-resistant layer could not be sufficiently ensured in Comparative Example 1 in which the used slurry composition for a heat-resistant layer contained a water-soluble polymer that only included an amide group-containing monomer unit and an acid group-containing monomer unit.

It can also be seen that dispersion stability and coatability of a slurry composition for a heat-resistant layer could not be sufficiently ensured in Comparative Example 2 in which the used slurry composition for a heat-resistant layer contained a water-soluble polymer that only included an amide group-containing monomer unit.

It can also be seen that dispersion stability and coatability of a slurry composition for a heat-resistant layer could not be sufficiently ensured and a heat-resistant layer having excellent heat shrinkage resistance could not be formed in Comparative Example 3 in which the used slurry composition for a heat-resistant layer contained a water-soluble polymer in which the proportional contents of an amide group-containing monomer unit and an acid group-containing monomer unit were outside of the specific ranges.

It can also be seen that dispersion stability of a slurry composition for a heat-resistant layer could not be sufficiently ensured and a heat-resistant layer having excellent heat shrinkage resistance could not be formed in Comparative Example 4 in which the used slurry composition for a heat-resistant layer contained a water-soluble polymer in which the proportional contents of an amide group-containing monomer unit and an acid group-containing monomer unit were outside of the specific ranges.

It can also be seen that coatability of a slurry composition for a heat-resistant layer could not be sufficiently ensured in Comparative Example 5 in which the used slurry composition for a heat-resistant layer contained a water-soluble polymer in which the proportional content of an acid group-containing monomer unit was outside of the specific range.

It can also be seen that the residual water content in a heat-resistant layer increased and cycle characteristics of a secondary battery deteriorated in Comparative Example 6 in which the used slurry composition for a heat-resistant layer did not contain non-conductive organic particles.

It can also be seen that a heat-resistant layer having excellent heat shrinkage resistance could not be formed and cycle characteristics of a secondary battery deteriorated in Comparative Example 7 in which the used slurry composition for a heat-resistant layer contained non-conductive organic particles in which the proportional content of a cross-linkable monomer unit was outside of the specific range.

It can also be seen that the residual water content in a heat-resistant layer increased and cycle characteristics of a secondary battery deteriorated in Comparative Example 8 and Comparative Example 9 in which a specific water-soluble polymer was not included.

INDUSTRIAL APPLICABILITY

According to the present disclosure, it is possible to provide a slurry composition for a non-aqueous secondary battery heat-resistant layer that has excellent dispersion stability and coatability and that can form a heat-resistant layer for a non-aqueous secondary battery having both excellent heat shrinkage resistance and reduced residual water content.

Moreover, according to the present disclosure, it is possible to provide a heat-resistant layer for a non-aqueous secondary battery that has both excellent heat shrinkage resistance and reduced residual water content and a non-aqueous secondary battery that includes this heat-resistant layer.

The invention claimed is:

1. A slurry composition for a non-aqueous secondary battery heat-resistant layer comprising a water-soluble polymer, non-conductive organic particles, and water, wherein
the water-soluble polymer includes an amide group-containing monomer unit, an acid group-containing monomer unit, and a hydroxyl group-containing monomer unit,
the amide group-containing monomer unit, the acid group-containing monomer unit, and the hydroxyl group-containing monomer unit are repeating units derived from an amide group-containing monomer, an acid group-containing monomer, and a hydroxyl group-containing monomer, respectively, used to obtain the water-soluble polymer,
proportional content of the amide group-containing monomer unit in the water-soluble polymer is not less than 63 mass % and not more than 98 mass % and proportional content of the acid group-containing monomer unit in the water-soluble polymer is not less than 1 mass % and not more than 20 mass %,
a molar ratio of proportional content of the hydroxyl group-containing monomer unit in the water-soluble polymer relative to proportional content of the acid group-containing monomer unit in the water-soluble polymer is 0.70 or more and 1.16 or less,
the non-conductive organic particles include a cross-linkable monomer unit, and
proportional content of the cross-linkable monomer unit in the non-conductive organic particles is not less than 20 mass % and not more than 95 mass %.

2. The slurry composition for a non-aqueous secondary battery heat-resistant layer according to claim 1, wherein proportional content of the hydroxyl group-containing monomer unit in the water-soluble polymer is not less than 1 mass % and not more than 25 mass %.

3. The slurry composition for a non-aqueous secondary battery heat-resistant layer according to claim 1, wherein the hydroxyl group-containing monomer unit is a hydroxyl group-containing (meth)acrylamide monomer unit.

4. The slurry composition for a non-aqueous secondary battery heat-resistant layer according to claim 1, further comprising a particulate polymer, wherein
the non-conductive organic particles have a glass-transition temperature of 110° C. or higher, and
the particulate polymer has a glass-transition temperature of lower than 20° C.

5. A heat-resistant layer for a non-aqueous secondary battery formed using the slurry composition for a non-aqueous secondary battery heat-resistant layer according to claim 1.

6. A non-aqueous secondary battery comprising the heat-resistant layer for a non-aqueous secondary battery according to claim 5.

* * * * *